(12) United States Patent
Sato et al.

(10) Patent No.: US 7,821,725 B2
(45) Date of Patent: Oct. 26, 2010

(54) IMAGE PICKUP LENS, IMAGE PICKUP APPARATUS AND MOBILE TERMINAL

(75) Inventors: Masae Sato, Machida (JP); Yasunari Fukuta, Hachioji (JP); Takashi Kawasaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/547,103

(22) Filed: Aug. 25, 2009

(65) Prior Publication Data

US 2010/0053770 A1 Mar. 4, 2010

(30) Foreign Application Priority Data

Aug. 28, 2008 (JP) ............... 2008-219699

(51) Int. Cl.
- G02B 9/34 (2006.01)
- G02B 3/02 (2006.01)
- G02B 9/04 (2006.01)

(52) U.S. Cl. ............... 359/773; 359/715; 359/793
(58) Field of Classification Search ........... 359/715, 359/717, 771–774, 793–795
See application file for complete search history.

(56) References Cited

U.S. PATENT DOCUMENTS

| | | | |
|---|---|---|---|
| 7,215,492 B2 * | 5/2007 | Sato et al. | 359/773 |
| 7,688,523 B2 * | 3/2010 | Sano | 359/715 |
| 2006/0238894 A1 | 10/2006 | Sano | |
| 2008/0088949 A1 | 4/2008 | Oh et al. | |
| 2008/0130143 A1 | 6/2008 | Oh et al. | |

FOREIGN PATENT DOCUMENTS

| | | |
|---|---|---|
| JP | 2006-323365 | 11/2006 |
| JP | 3929479 | 3/2007 |
| JP | 3976781 | 6/2007 |

OTHER PUBLICATIONS

European Search Report dated Oct. 13, 2009.

* cited by examiner

*Primary Examiner*—Scott J Sugarman
(74) *Attorney, Agent, or Firm*—Finnegan, Henderson, Farabow, Garrett & Dunner, L.L.P.

(57) ABSTRACT

An image pickup lens includes a first lens block with a positive power and a second lens block with a positive or negative power. The first lens block includes a first lens substrate, and lens portions 1$a$ and 1$b$ arranged on opposing surfaces of the first lens substrate. The lens portions 1$a$ and 1$b$ are different from the first lens substrate in at least one of a refractive index and an Abbe number. The second lens block includes a second lens substrate, and lens portions 2$a$ and 2$b$ arranged on opposing surfaces of the second lens substrate. The lens portions 2$a$ and 2$b$ are different from the second lens substrate in at least one of a refractive index and an Abbe number. The image pickup lens satisfies a condition relating to focal lengths of the lens portions 1$a$ and 2$b$.

14 Claims, 18 Drawing Sheets

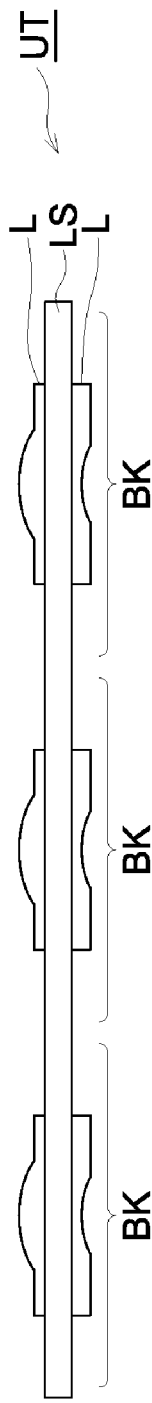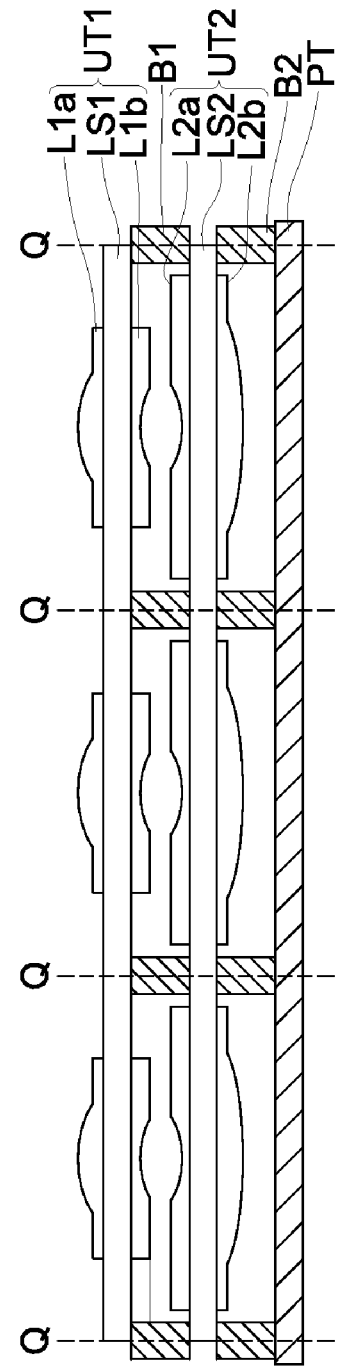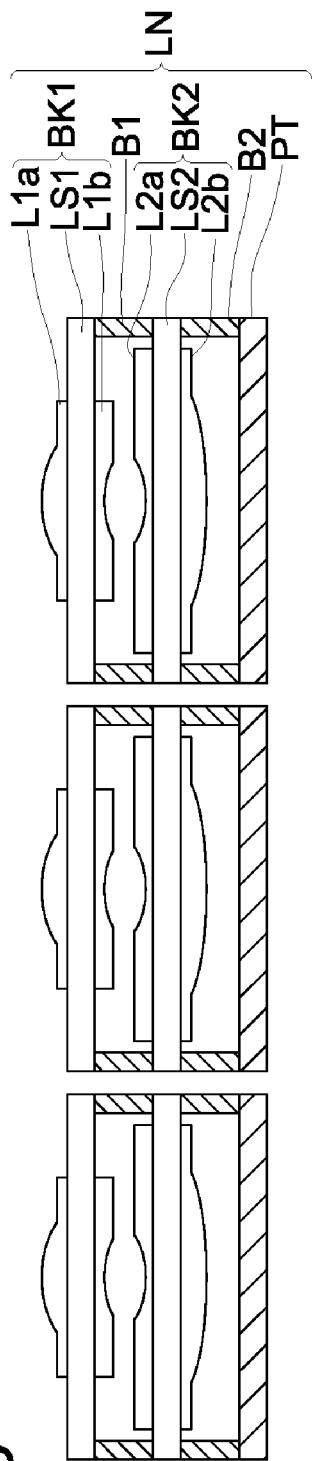

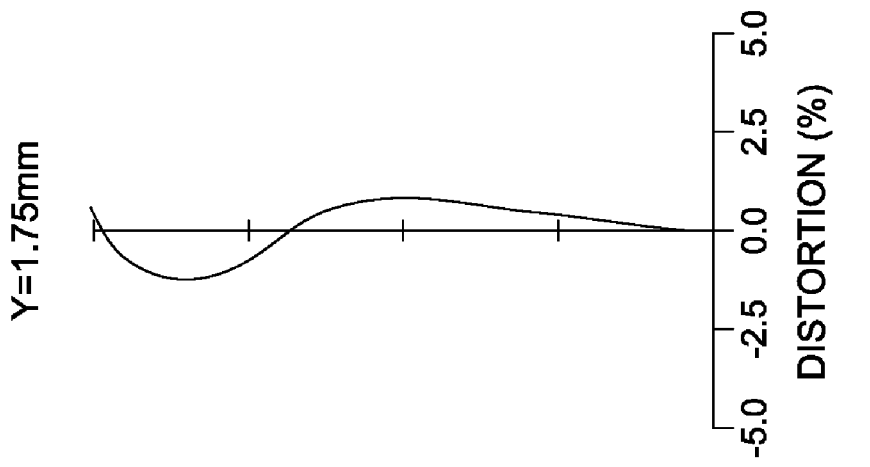
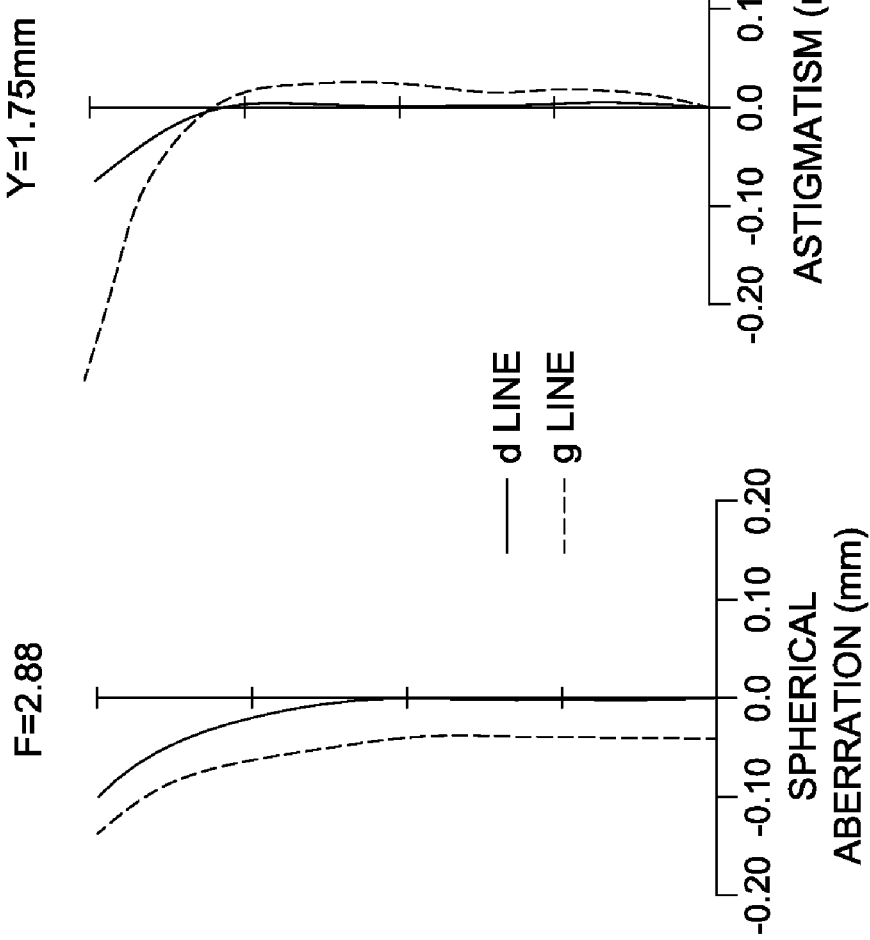

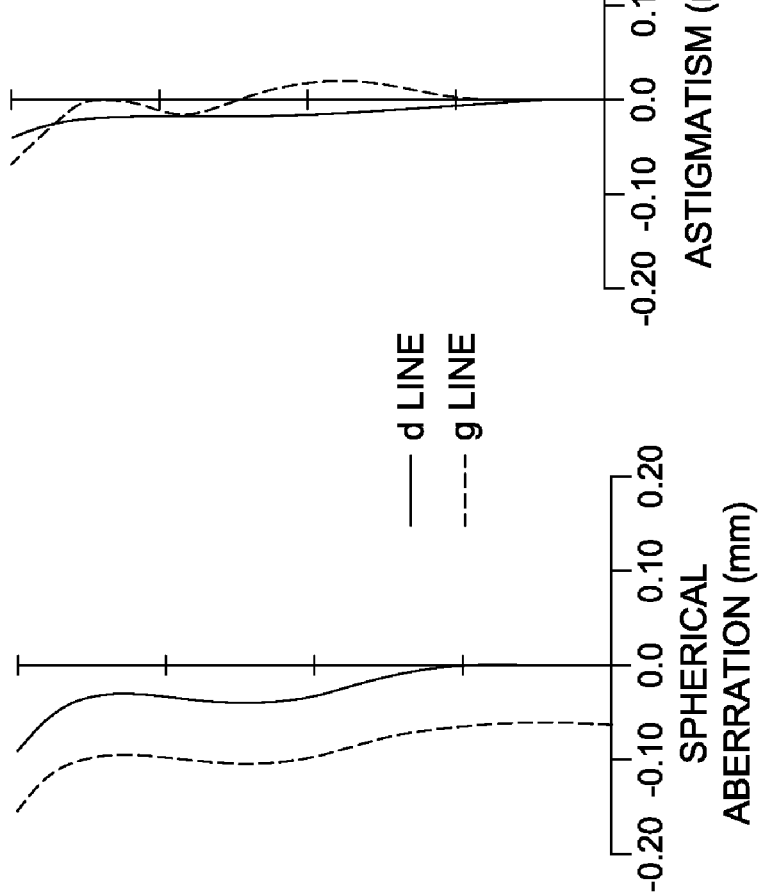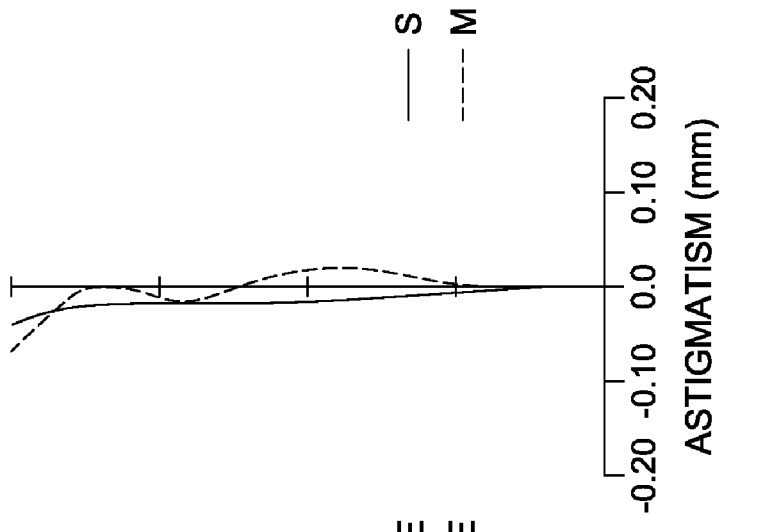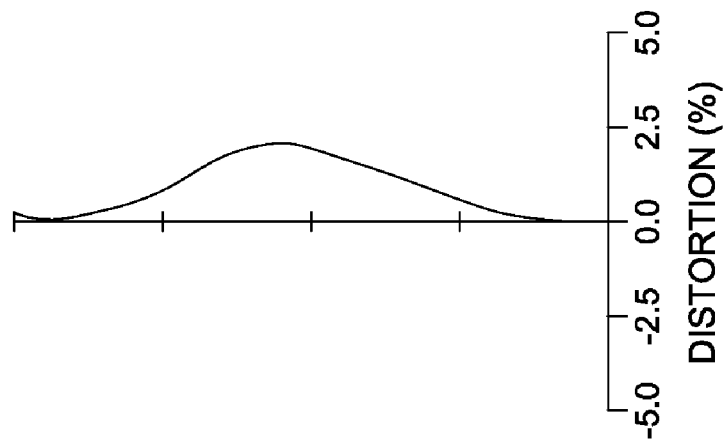

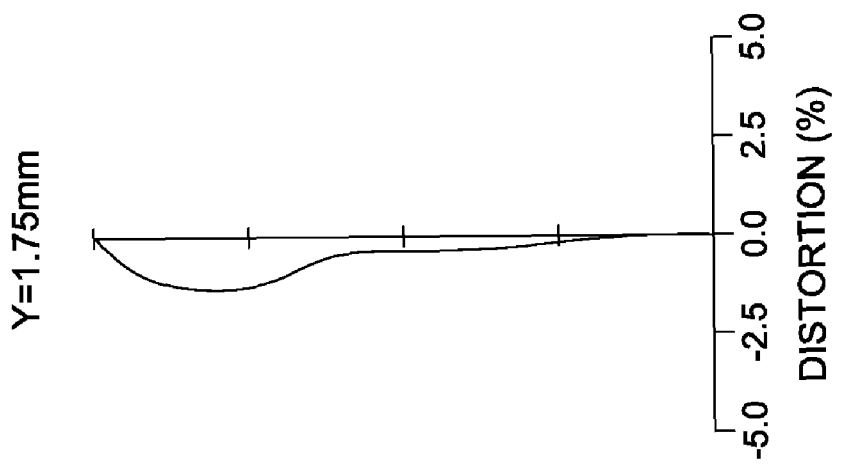
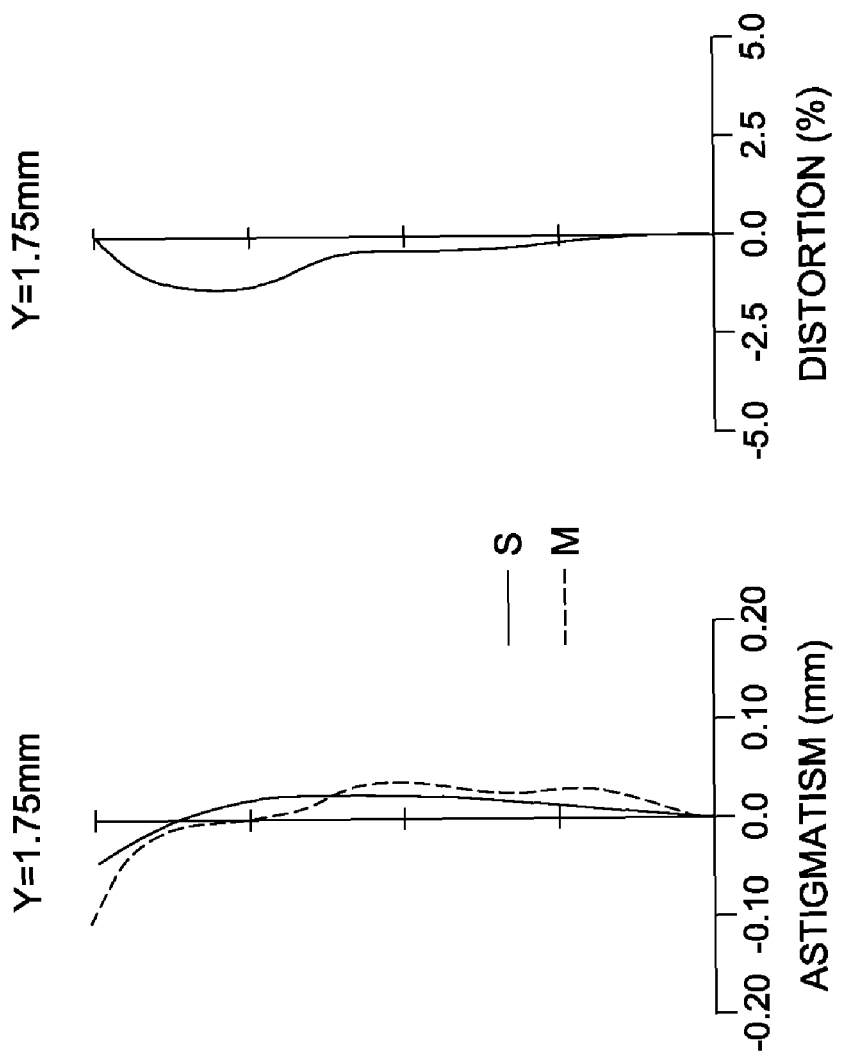
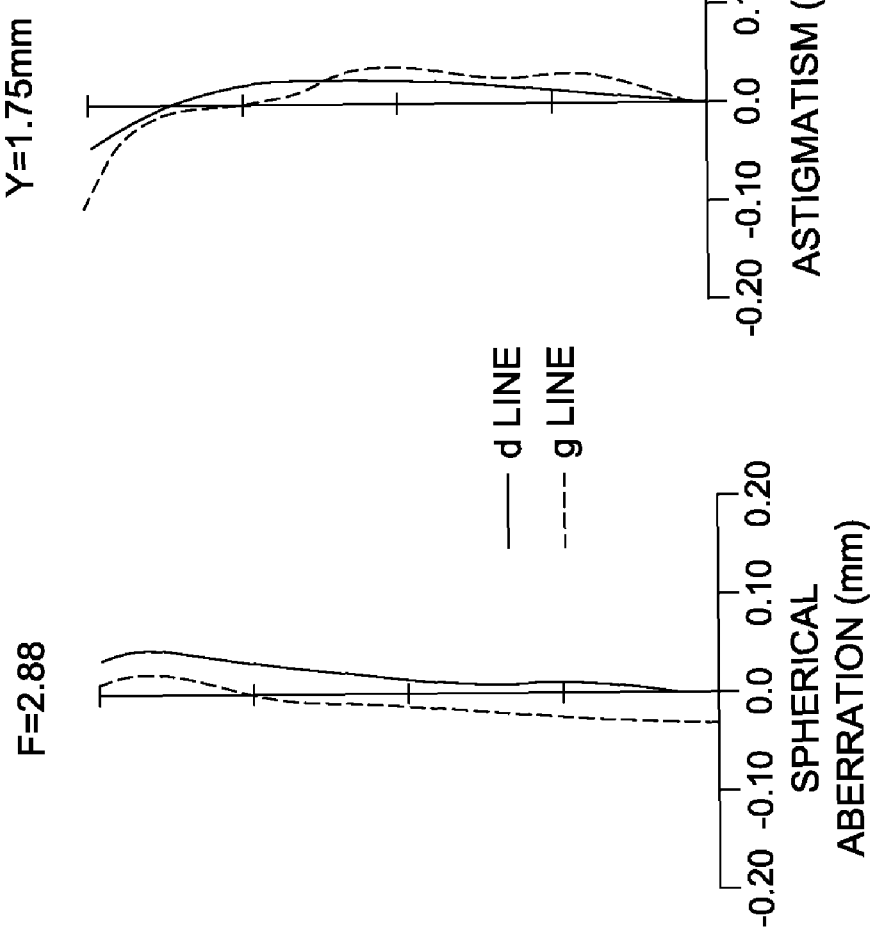

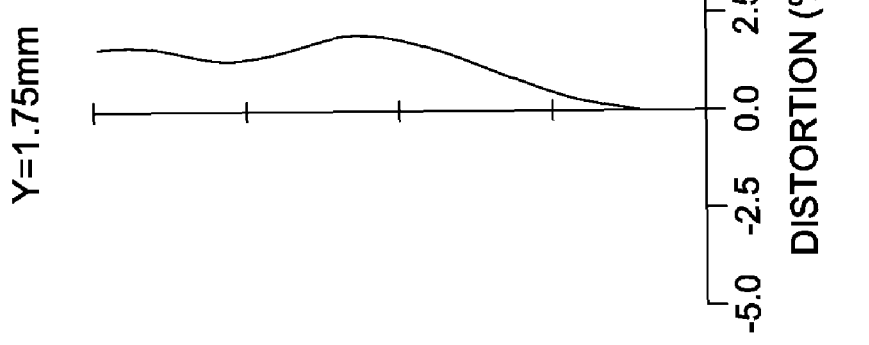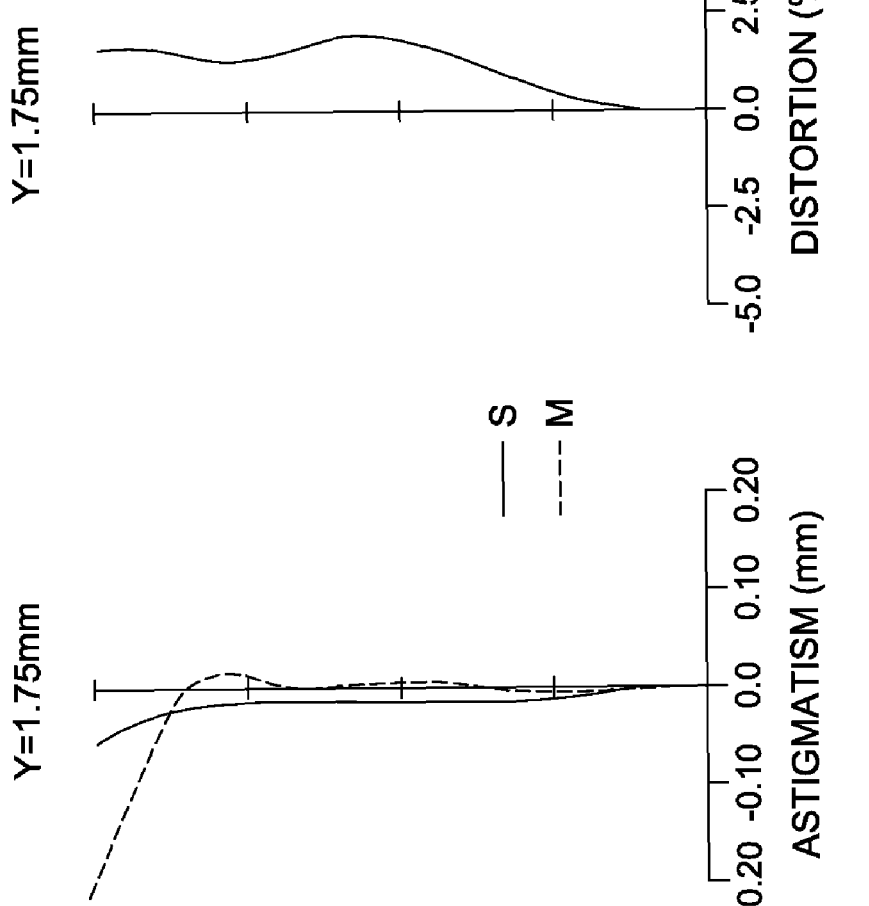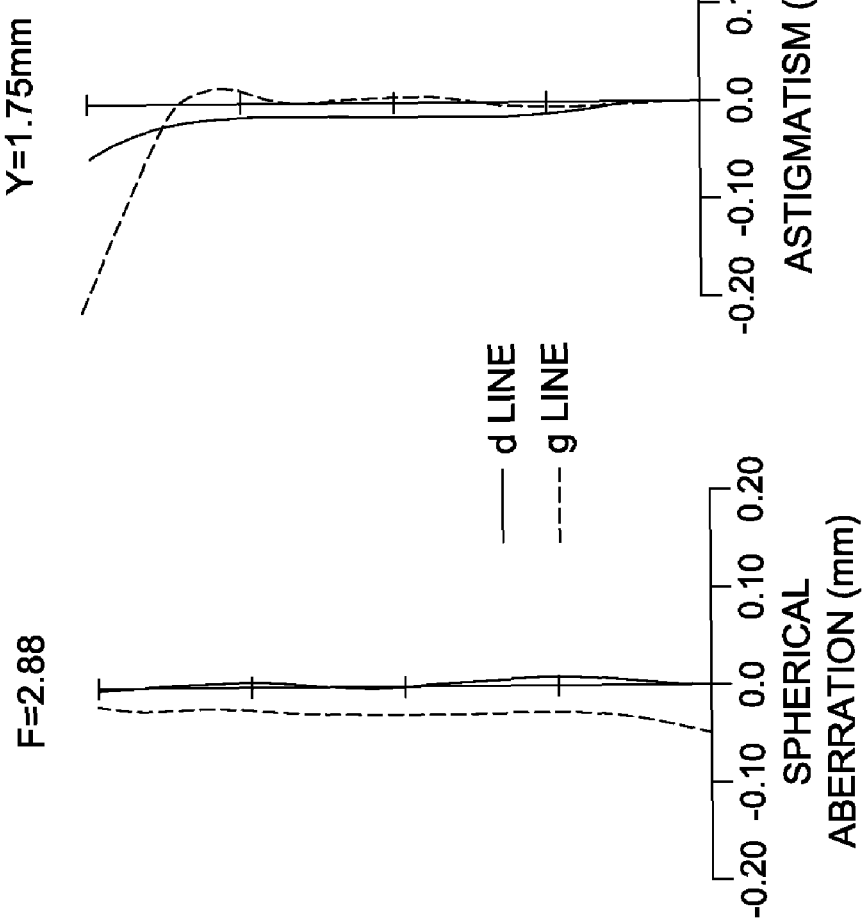

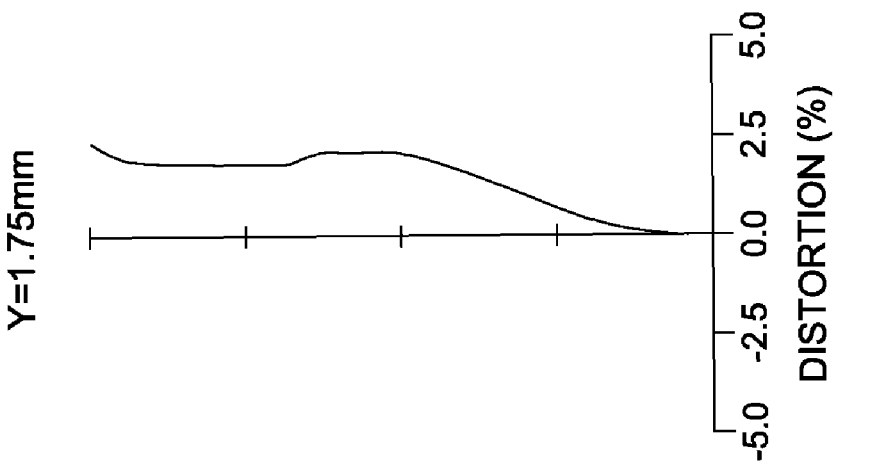
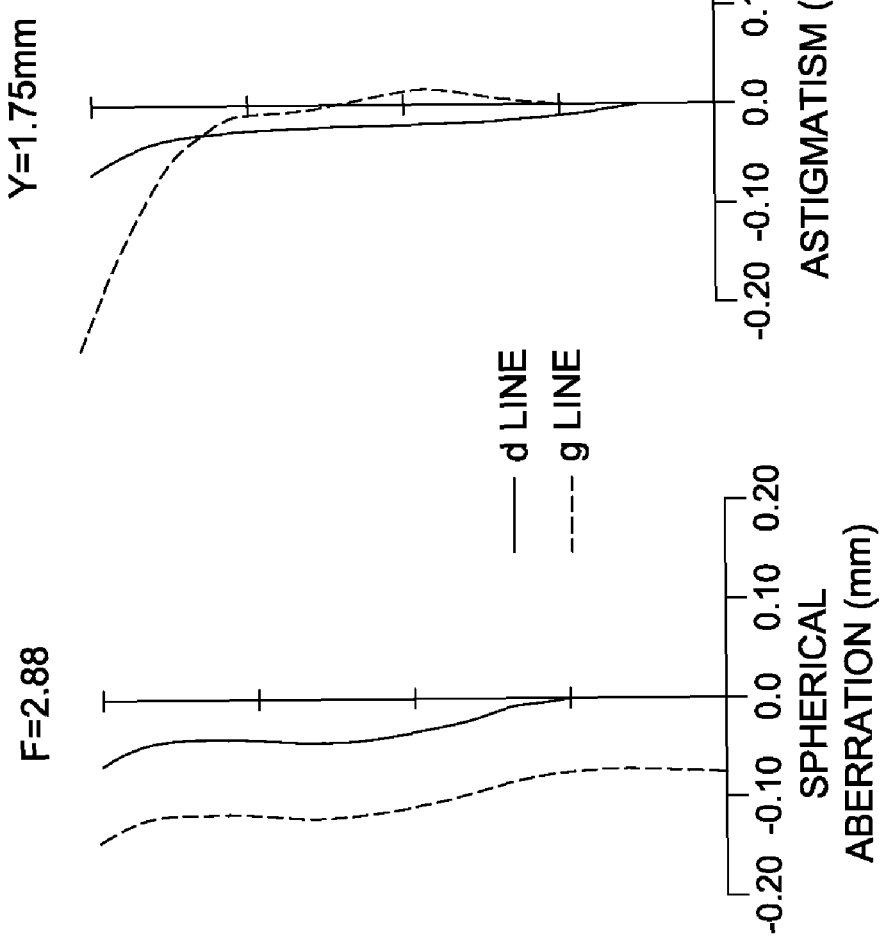

IMAGE PICKUP LENS, IMAGE PICKUP APPARATUS AND MOBILE TERMINAL

This application is based on Japanese Patent Application No. 2008-219699 filed on Aug. 28, 2008, in Japanese Patent office, the entire content of which is hereby incorporated by reference.

TECHNICAL FIELD

The present invention relates to an image pickup lens of an image pickup apparatus employing a solid-state imaging device such as an image sensor of CCD (Charge Coupled Devices) type and an image sensor of CMOS (Complementary Metal-Oxide Semiconductor) type. More particularly, it relates to an image pickup lens in an optical system employing a wafer-scale lens suitable for mass production, an image pickup apparatus employing the image pickup lens, and a mobile terminal.

BACKGROUND

A compact and thin-type image pickup apparatus has come to be mounted on a mobile terminal representing a compact and thin-type electronic hardware such as a cell-phone and PDA (Personal Digital Assistant), whereby, it has become possible to transmit mutually not only voice information but also image information to a remote location.

As image pickup elements used for these image pickup apparatuses, a solid-state imaging device such as an image sensor of a CCD type and an image sensor of a CMOS type are used. In recent years, increase of pixel numbers of the image pickup element have been advanced, and enhancement of its resolution and performance have been attained. As a lens for forming an image of a photographic object on the imaging device, a lens made by resin that is suitable for mass production has come to be used for further cost reduction. In addition, the lens made by resin is excellent in terms of its workability and has satisfied requirements for enhancement of its performance, by being formed in aspheric shape because its workability is excellent.

As an image pickup lens of this kind used for an image pickup apparatus housed in a mobile terminal, an optical system of a three-element structure including three plastic lenses and an optical system of a three-element structure including one glass lens and two plastic lenses are widely known. However, a demand for further compactness for these image pickup lenses and a demand for mass productivity required for the mobile terminal are becoming stronger, and the compatibility between both demands is becoming more difficult.

To solve these problems, there has been proposed a method to produce a large number of lens modules as followings. There is provided a glass substrate in a size of several inches, which is formed in a parallel flat plate. A large amount of lens elements are simultaneously formed on the glass substrate through a replica method. Then, the glass substrate (lens wafer) on which a large number of lens elements are formed is combined with a sensor wafer and is cut off to produce a large number of lens modules. Lenses manufactured by this method are called wafer-scale lenses, and lens modules manufactured by this method are called wafer-scale lens modules.

Additionally to the method to produce a large number of lens modules, there has recently been suggested a method to mount the large number of lens modules on a substrate at low cost, as followings. Lens modules are arranged together with IC (Integrated Circuit) chips and other electronic parts on a substrate on which a solder is potted in advance. By adding reflow processing (heating processing) to the substrate to melt the solder as the lens modules are arranged thereon, the electronic components and the lens modules are simultaneously mounted on the substrate. Image pickup lenses that withstand reflow processing and are excellent in heat resistance is also demanded.

As the image pickup lens of this kind, there are proposed lenses shown in JP-B Nos. 3929479 and 3976781 which disclose lens blocks of a two-element structure. However, in these lenses, aberration correcting power is insufficient, and it is difficult to say that these image pickup lenses sufficiently copes with a solid-state imaging device with larger number of pixels. In particular, chromatic aberration is hardly corrected in these lenses, thereby, an image pickup lens shown in JP-A No. 2006-323365 in which a diffractive surface is applied on a lens substrate is also proposed.

However, in the image pickup lens shown in JP-A No. 2006-323365, the application of the diffraction surface rises the degree of difficulty in manufacturing, and decreases diffraction efficiency for a wavelength other than a design wavelength. It generates a diffracted light of unwanted order, resulting in a problem of ghost.

SUMMARY

The invention has been achieved in view of the aforesaid situations, to provide an image pickup lens, and an image pickup apparatus and a mobile terminal employing the image pickup lens. By providing the image pickup lens as an optical system which exhibits less deterioration in terms of lens property despite high heating resistance and manufacturing errors, mass production of image pickup lenses as wafer-scale lenses is realized. It allows to provide compact image pickup apparatuses with excellent aberration performance in reduced cost.

The image pickup lens comprises, in order from an object side thereof: a first lens block with a positive refractive power and a second lens block with a positive or negative refractive power. The first lens block comprises a first lens substrate being a parallel flat plate, and lens portions 1a and 1b having a positive or negative refractive power. The lens portions 1a and 1b are arranged on an object side surface and an image side surface of the first lens substrate, and are different from the first lens substrate in at least one of a refractive index and an Abbe number. The second lens block comprises a second lens substrate being a parallel flat plate, and lens portions 2a and 2b having a positive or negative refractive power. The lens portions 2a and 2b are arranged on an object side surface and an image side surface of the second lens substrate and are different from the second lens substrate in at least one of a refractive index and an Abbe number. The lens portion 1a is arranged on the object side surface of the first lens substrate, and an object side surface of the lens portion 1a is a convex surface facing the object side. The lens portion 1b is arranged on the image side surface of the first lens substrate, and an image side surface of the lens portion 1b is a concave surface facing an image side. The lens portion 2a is arranged on the object side surface of the second lens substrate, and an object side surface of the lens portion 2a is a convex surface facing the object side. The lens portion 2b is arranged on the image side surface of the second lens substrate, and an image side surface of the lens portion 2b is a concave surface facing the image side. The image pickup lens satisfies the predetermined condition relating to focal lengths of the lens portions 1a and 2b in the air.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 5:
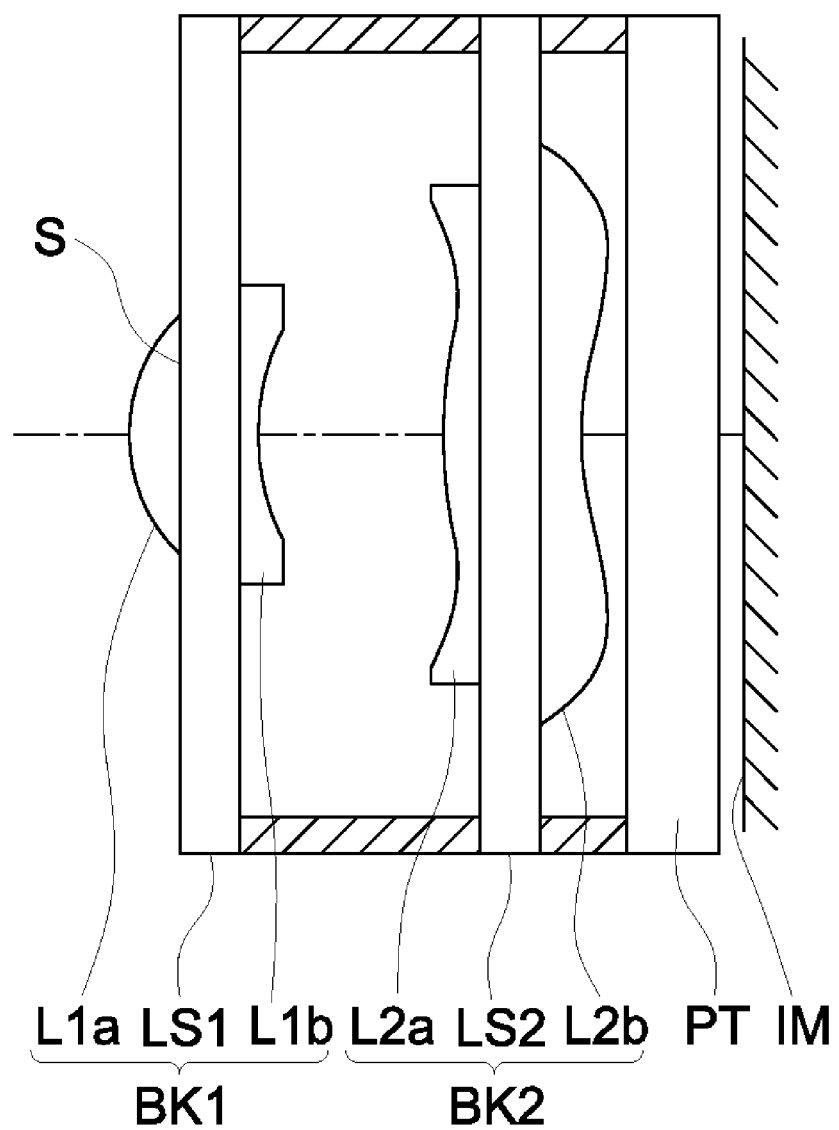
Figure 7:
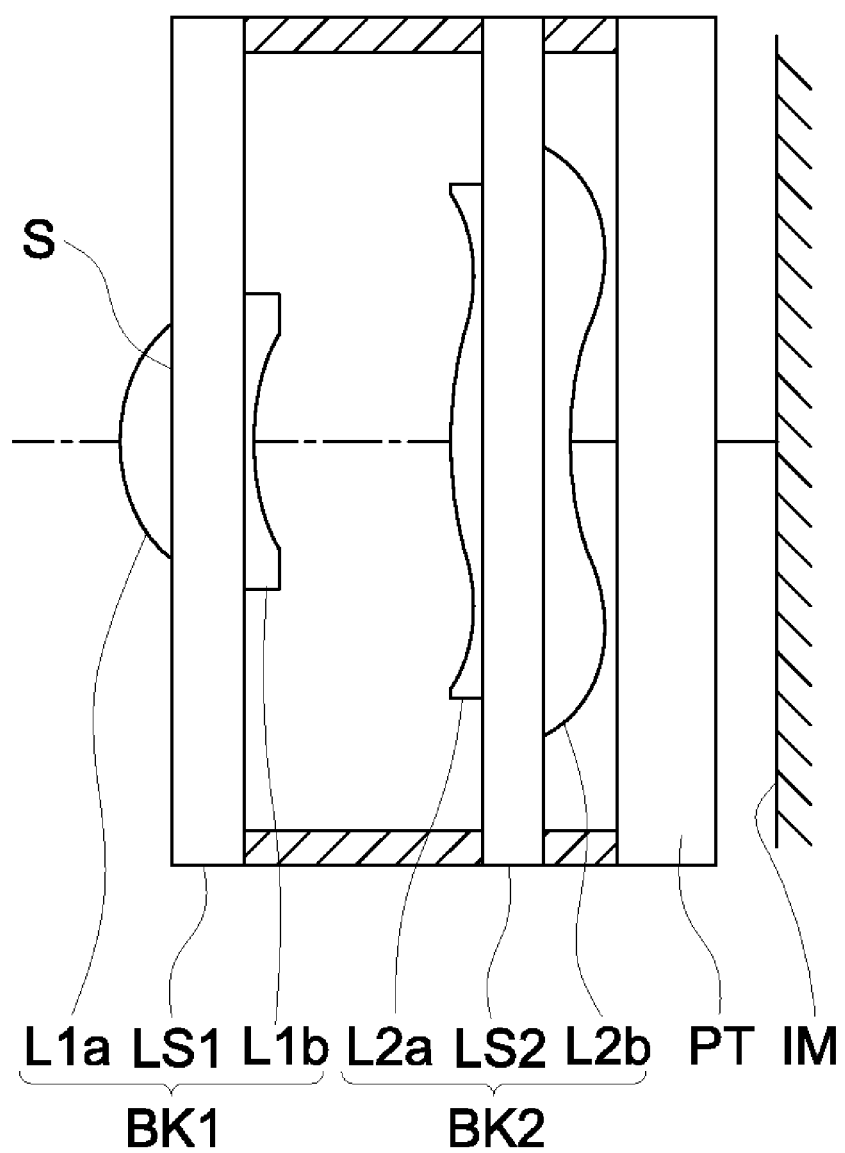
Figure 8:
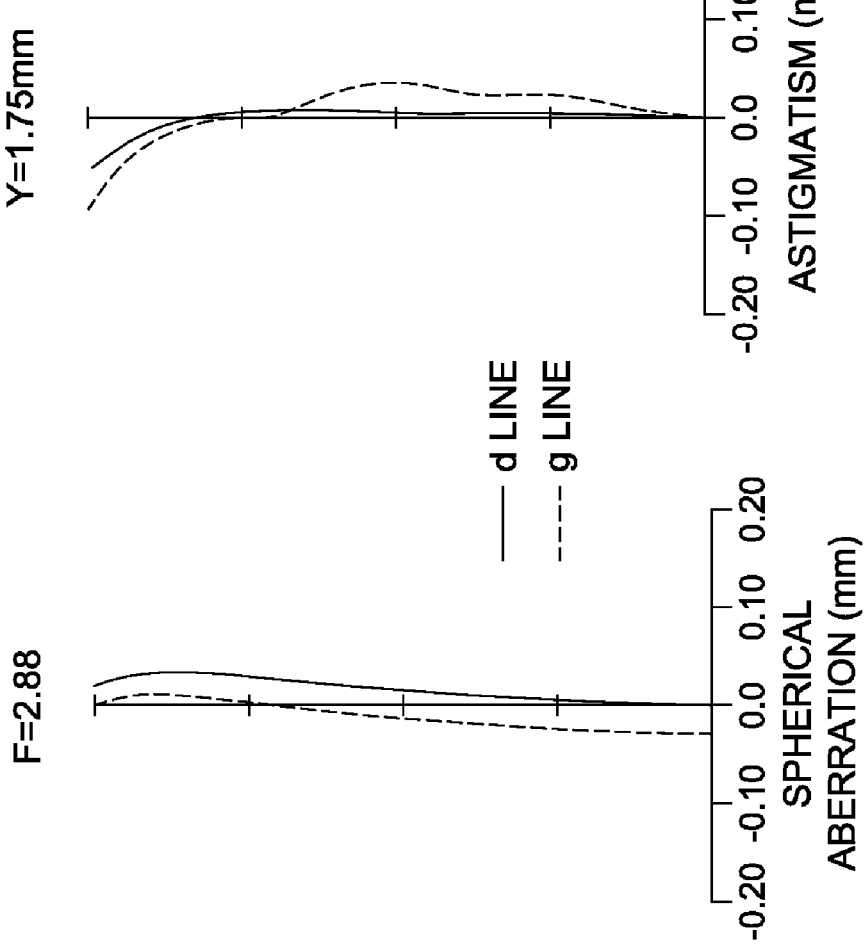
Figure 9:
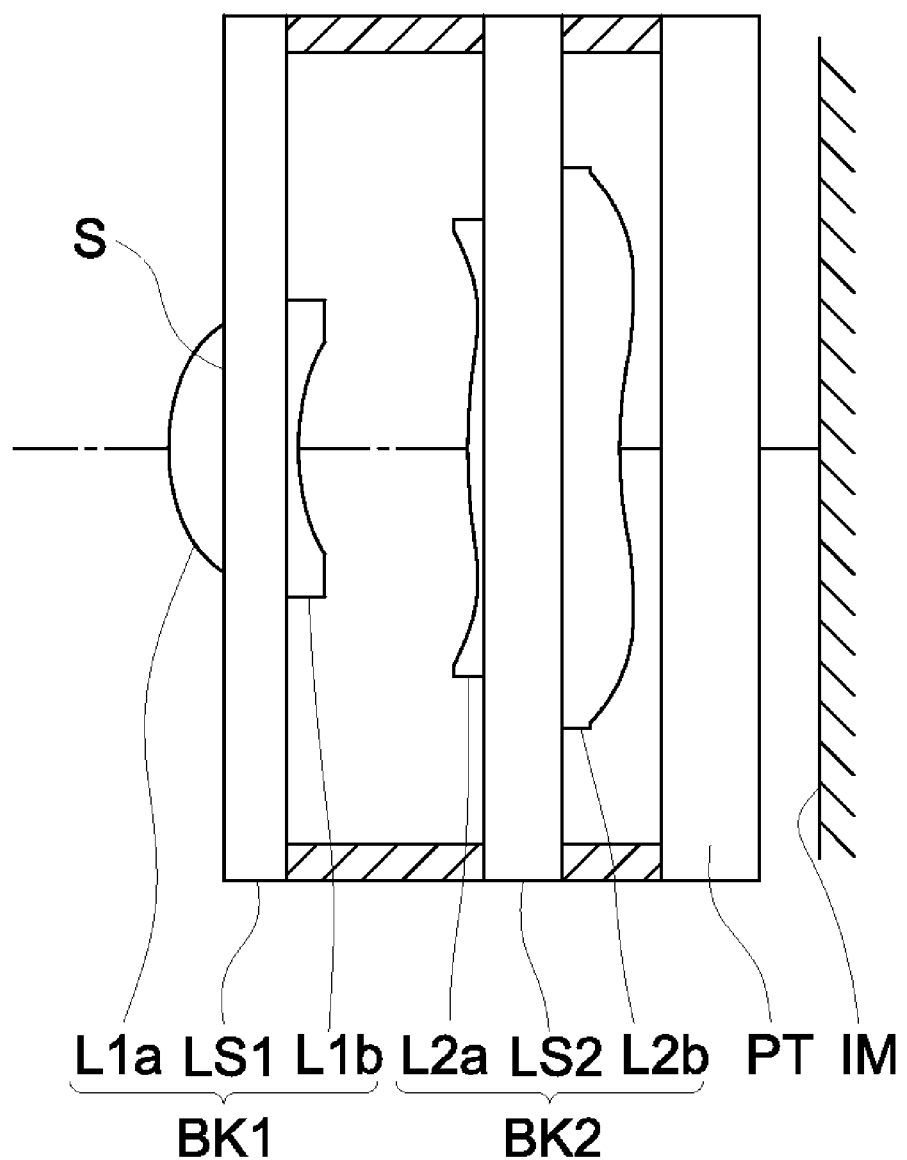
Figure 11:
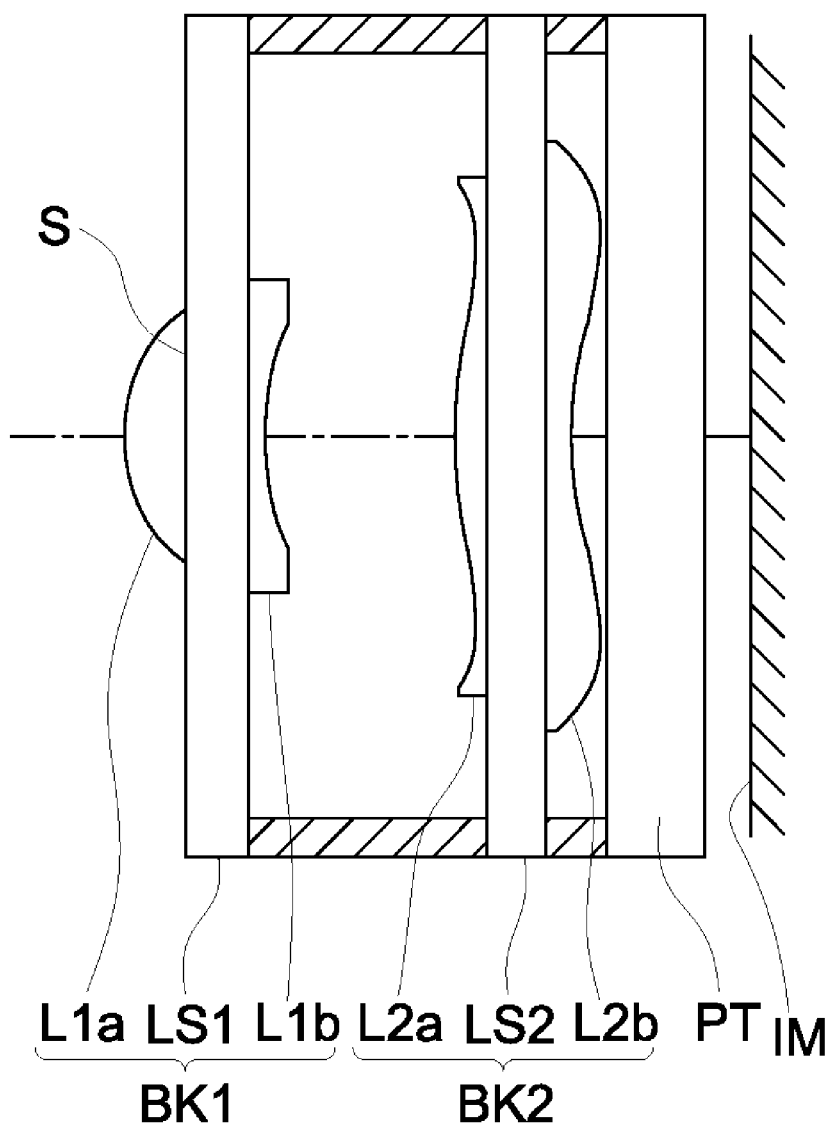
Figure 13:
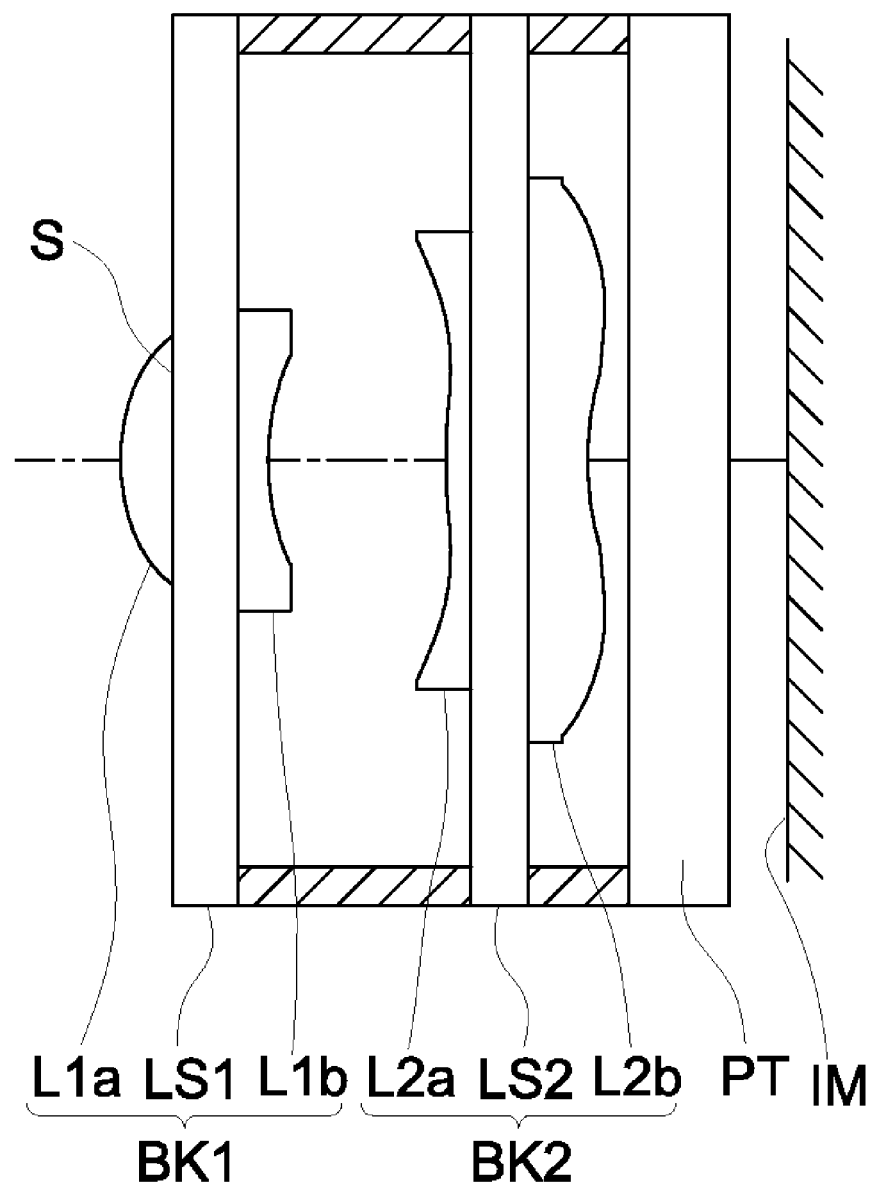
Figure 15:
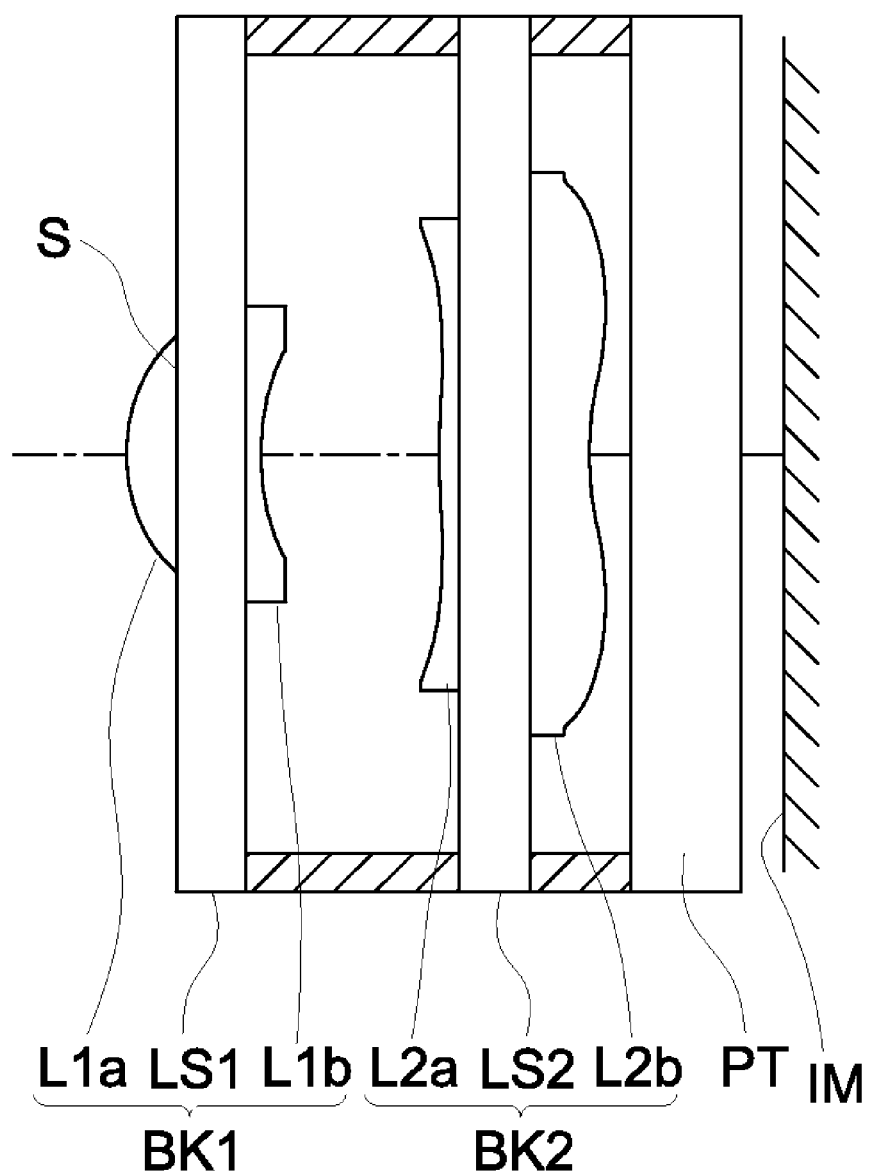
Figure 17:
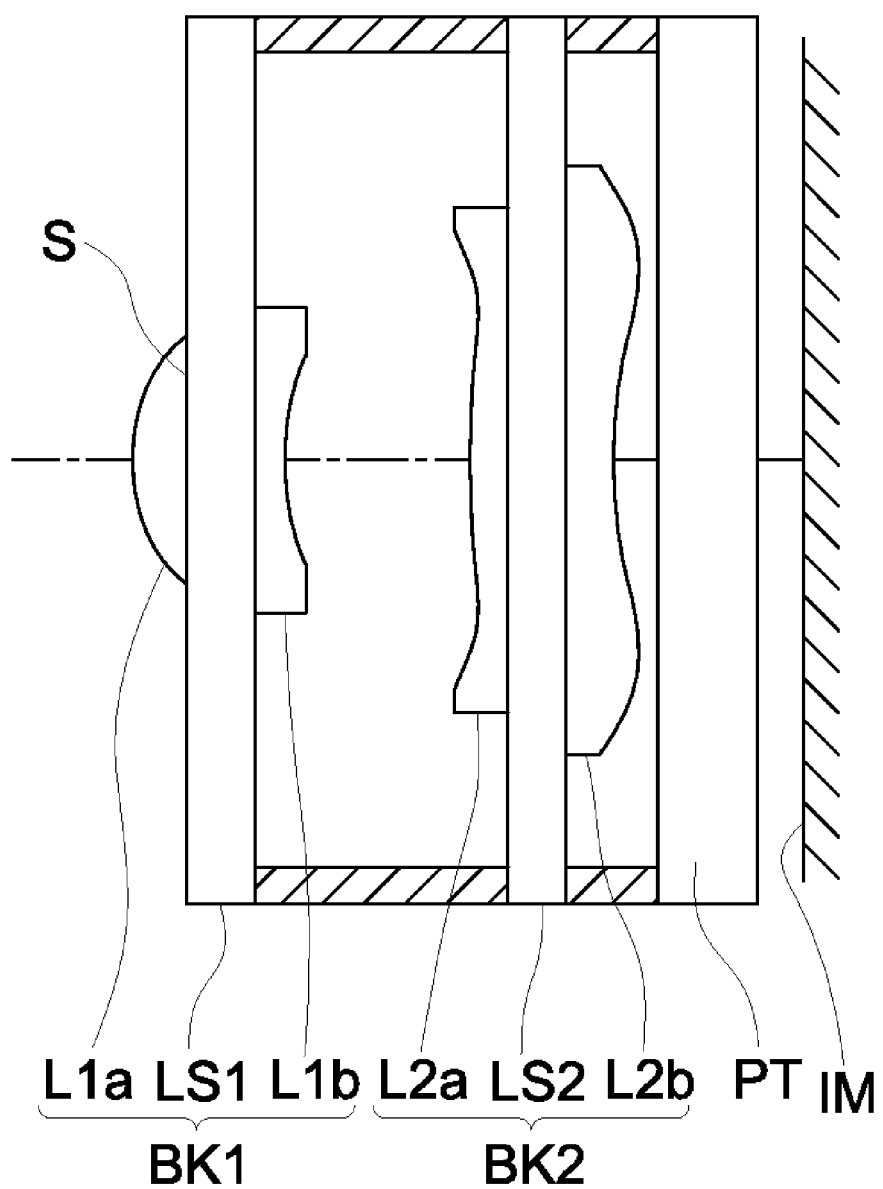
Figure 18C:
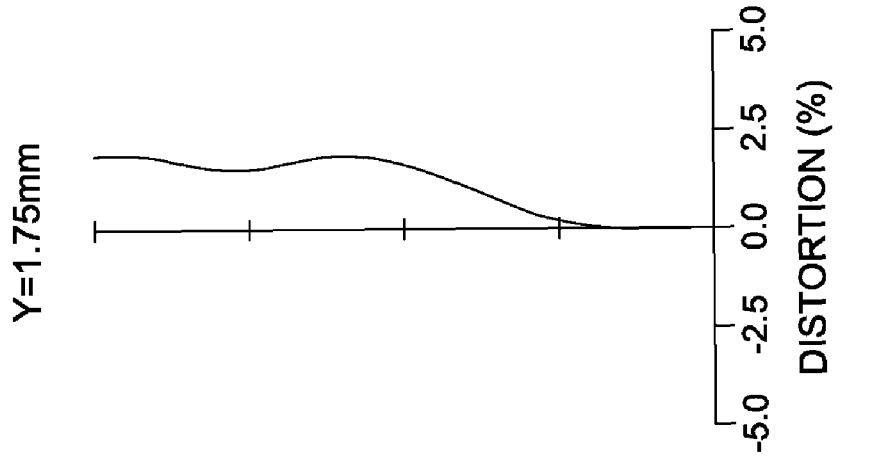
Figure 18B:
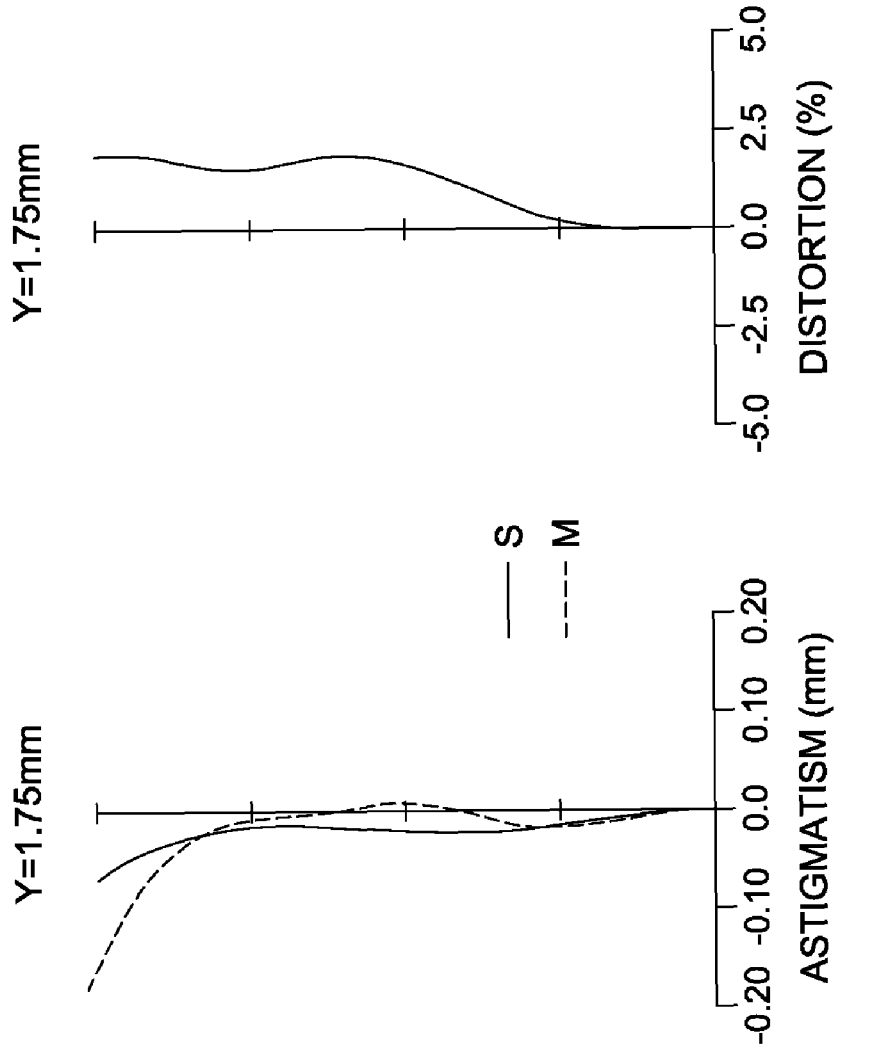
Figure 18A:
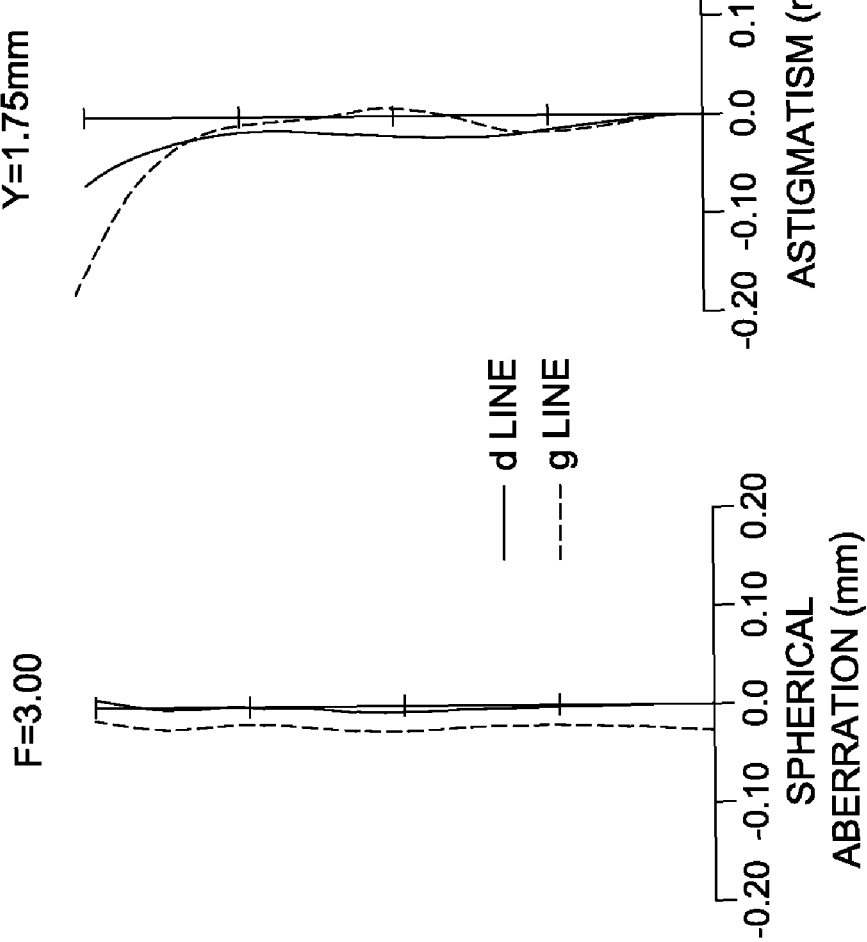

Each of FIGS. 4a to 4c is a diagram showing the manufacturing process of image pickup lens LN;

FIG. 5 is a cross-sectional view of the image pickup lens relating to Example 1;

FIGS. 6a, 6b, and 6c are diagrams of spherical aberration, astigmatism and distortion of the image pickup lens relating to Example 1, respectively;

FIG. 7 is a cross-sectional view of the image pickup lens relating to Example 2;

FIGS. 8a, 8b, and 8c are diagrams of spherical aberration, astigmatism and distortion of the image pickup lens relating to Example 2, respectively;

FIG. 9 is a cross-sectional view of the image pickup lens relating to Example 3;

FIGS. 10a, 10b, and 10c are diagrams of spherical aberration, astigmatism and distortion of the image pickup lens relating to Example 3, respectively;

FIG. 11 is a cross-sectional view of the image pickup lens relating to Example 4;

FIGS. 12a, 12b, and 12c are diagrams of spherical aberration, astigmatism and distortion of the image pickup lens relating to Example 4, respectively;

FIG. 13 is a cross-sectional view of the image pickup lens relating to Example 5;

FIGS. 14a, 14b, and 14c are diagrams spherical aberration, astigmatism and distortion of the image pickup lens relating to relating to Example 5, respectively;

FIG. 15 is a cross-sectional view of the image pickup lens relating to Example 6;

FIGS. 16a, 16b, and 16c are diagrams of spherical aberration, astigmatism and distortion of the image pickup lens relating to Example 6, respectively;

FIG. 17 is a cross-sectional view of the image pickup lens relating to Example 7; and FIGS. 18a, 18b, and 18c are diagrams of spherical aberration, astigmatism and distortion of the image pickup lens relating to Example 7, respectively.

DESCRIPTION OF THE PREFERRED EMBODIMENT

Preferred Embodiments of the present invention will be described below.

A preferred embodiment of the present invention is an image pickup lens comprising, in order from an object side thereof: a first lens block with a positive refractive power and a second lens block with a positive or negative refractive power. The first lens block comprises a first lens substrate being a parallel flat plate, and lens portions 1a and 1b each having a positive or negative refractive power. The lens portions 1a and 1b are arranged on an object side surface and an image side surface of the first lens substrate, and are different from the first lens substrate in at least one of a refractive index and an Abbe number. The second lens block comprises a second lens substrate being a parallel flat plate, and lens portions 2a and 2b each having a positive or negative refractive power. The lens portions 2a and 2b are arranged on an object side surface and an image side surface of the second lens substrate, and are different from the second lens substrate in at least one of a refractive index and an Abbe number. The lens portion 1a is arranged on the object side surface of the first lens substrate, and an object side surface of the lens portion 1a is a convex surface facing the object side. The lens portion 1b is arranged on the image side surface of the first lens substrate, and an image side surface of the lens portion 1b is a concave surface facing an image side. The lens portion 2a is arranged on the object side surface of the second lens substrate, and an object side surface of the lens portion 2a is a convex surface facing the object side. The lens portion 2b is arranged on the image side surface of the second lens substrate, and an image side surface of the lens portion 2b is a concave surface facing the image side. The image pickup lens satisfies the following conditional expressions.

$$0.4 < f1a/f < 0.9 \quad (1)$$

$$-3.0 < f2b/f < -0.5 \quad (2)$$

In the expressions, f1a is a focal length of the lens portion 1a in an air, f2b is a focal length of the lens portion 2b in the air, and f is a composite focal length of a total system of the image pickup lens.

According to the embodiment, an image pickup lens includes two lens blocks. The first lens block has positive refractive power. The surface on the object side of lens portion 1a in the first lens block has a convex surface toward the object side, and the surface on the image side of lens portion 1b has a concave surface shape toward the image side. The second lens block has positive or negative refractive power. The surface on the object side of the lens portion 2a in the second lens block has a convex surface shape toward the object side, and the surface on the image side of lens portion 2b has a concave surface shape toward the image side. By providing the first lens block as a so-called meniscus shape whose convex surface faces the object side, it is possible to move a principal point of the total system of the image pickup lens toward the object side. Thereby, it is possible to downsize the image pickup lens. Further, by providing the second lens block as a so-called meniscus shape whose convex surface faces the object side, telecentricity which are needed by an image pickup lens employing a solid-state imaging device can easily be secured.

Further, by making a material of lens portions to be different from that of lens substrates, it is possible to make difference between lens portions and lens substrate in terms of a refractive index or Abbe number. Thereby, degree of freedom in the lens design increases, and aberration can be corrected properly.

In addition, by making each lens substrates to be a parallel flat plate, processing becomes easy and the boundaries of the lens portions and the lens substrate does not have a power. It reduces an influence of profile irregularity of a surface, on a position of a focal point on an image plane. Further, it is possible to make a shape of a lens substrate to be substantially the same as that of a wafer, which makes assembling of a water scale lens easy.

As for the manufacture of a wafer-scale lens, its target is to attain mass production that is greater in terms of a scale than existing manufacturing methods, and to raise a yield rate by reducing manufacture error sensitivity of an optical system, resulting in great contribution to cost reduction.

When the value of the expression (1) exceeds the lower limit, positive power of lens portion 1a does not become too strong. It prevents the image pickup lens from extreme performance degradation while the total lens length is maintained, even in the case where microscopic decentration is caused in the course of manufacture of the lens portion 1a. On the other hand, when the value of the conditional expression (1) is lowered than the upper limit, positive power of the lens portion 1a does not become too weak, and it is possible to prevent the total length of the optical pickup lens from being too long. Owing to this, the image pickup lens can correct various aberrations properly, and maintains high capabilities, while making mass production to be easy.

Incidentally, the following expression is more preferable.

$$0.45 < f1a/f < 0.8 \quad (1')$$

The following expression is further more preferable.

$$0.5 < f1a/f < 0.7 \quad (1'')$$

Further, when the value of the conditional expression (2) exceeds the lower limit, it is possible to properly strengthen negative refractive power of the lens portion 2b, and to control Petzval's Sum to be small, which makes correction of the field curvature easy. It is further possible to prevent the total length of the image pickup lens from growing unwillingly greater. On the other hand, when the value of the conditional expression (2) is lowered than the upper limit, negative refractive power of the lens portion 2b does not become too strong, and occurrences of distortion and coma flare can be controlled. It is also possible to prevent the second lens block from being too close to an image pickup element. The second lens block positioned at excessively close position to the image pickup element, reduces a space for arranging a cover glass and IR cut filter between them. It causes a restriction in surface shape of lens portions and requires excessively thin cover glass and IR cut filter, which worsens workability of the image pickup lens.

It is preferable that the aforesaid image pickup lens satisfies the following conditional expression (2').

$$-2.5 < f2b/f < -0.55 \quad (2')$$

A range of the following expression is more preferable.

$$-2.0 < f2b/f < -0.6 \quad (2'')$$

It is preferable that the aforesaid image pickup lens satisfies the following conditional expression (3).

$$-1.5 < r1b/((1-n1b) \cdot f) < -0.7 \quad (3)$$

In the expression stated above, r1b is a curvature radius of the image side surface of the lens portion 1b, n1b is a refractive index of the lens portion 1b at d line, and f is the composite focal length of the total system of the image pickup lens.

The conditional expression (3) establishes negative refractive power of the image side surface of the lens portion 1b properly, and stipulates conditions for making correction of the field curvature to be easy. When the value of the conditional expression (3) exceeds the lower limit, negative refractive power of the image side surface of the lens portion 1b can be maintained properly, thereby, positive Petzval's Sum is reduced, and correction of the field curvature becomes to be easy. On the other hand, when the value of the conditional expression (3) is lowered than the upper limit, negative refractive power of the image side surface of the lens portion 1b does not grow to be too great beyond necessity, thus, occurrence of coma flare of an off-axis light flux and distortion can be controlled. Incidentally, a range of the following expression is more preferable.

$$-1.3 < r1b/((1-n1b) \cdot f) < -0.8 \quad (3')$$

A range of the following expression is further more preferable.

$$-1.2 < r1b/((1-n1b) \cdot f) < -0.85 \quad (3'')$$

In the image pickup lens, it is preferable that the object side surface of the lens portion 2a is in an aspheric shape which are formed in a convex surface facing the object side around an optical axis, and are formed in a concave surface facing the object side on a peripheral area crossing to a principal ray at a maximum image height.

In the image pickup lens of the embodiment, the second lens block is positioned on the image side to be close to a solid-state imaging device, and separated light fluxes enter the lens block. Therefore, it is possible to obtain effects of an aspheric surface effectively by making lens portion 2a to be in an aspheric shape. Further, by forming the second lens block in a shape with an inflection point such that an area around the optical axis is formed in a convex surface and a peripheral area that crosses to a principal ray at the maximum image height is formed in a concave surface, it is possible to converge a light flux on the peripheral of an image. Thereby, correction of distortion and improvement of telecentricity can be realized in a balanced manner.

It is preferable that the aforesaid image pickup lens satisfies the following conditional expression (4).

$$0 < v1a - v1b < 40 \quad (4)$$

In the expression, v1a is an Abbe number of the lens portion 1a, and v1b is an Abbe number of the lens portion 1b.

The conditional expression (4) is for setting Abbe number of the first lens block properly and for correcting chromatic aberration satisfactorily. When the value of the conditional expression (4) exceeds the lower limit, it is possible to regulate magnification chromatic aberration generated on the peripheral light flux to be small, while preventing longitudinal chromatic aberration from being under-corrected. On the other hand, when the value of the conditional expression (4) is lowered than the upper limit, it is possible to regulate magnification chromatic aberration to be small, while preventing axial chromatic aberration from being over-corrected. Incidentally, a range of the following expression is more preferable.

$$5 < v1a - v1b < 35 \quad (4')$$

The aforesaid image pickup lens preferably satisfies the following conditional expression (5).

$$0 < f1/|f2| < 0.3 \quad (5)$$

In the expression, f1 is a composite focal length of the first lens block and f2 is a composite focal length of the second lens block.

When the value of the conditional expression (5) is lowered than the upper limit, a focal length of the second lens block does not become too small in comparison with the first lens block, and a principal point of the total system of the image pickup lens can be shifted to the object side, thus, it is possible to correct aberration satisfactorily, while downsizing the image pickup lens.

It is preferable that the above image pickup lens further comprises an aperture stop arranged on the first lens substrate.

Arranging an aperture stop on a lens substrate means that the aperture stop is arranged between a lens portion and a lens substrate. Owing to this, the number of optical members can be reduced, and an aperture stop can be formed simultaneously through vacuum evaporation processing at the same time of vacuum evaporation processing for IR (InfraRed) blocking coating and for AR (Anti-Reflection) coating, resulting in cost reduction and improvement of mass productivity. Meanwhile, it is preferable that the aperture stop is arranged at the object side on the first lens substrate in the first lens block. By arranging the aperture stop to be closest to the object in the image pickup lens, it is possible to make a position of an exit pupil away from an image pickup element, resulting in improvement of the telecentricity.

In the above image pickup lens, each of the first lens substrate and the second lens substrate preferably comprises a glass material. A softening temperature of glass is higher than that of resin. A lens substrate made of glass hardly varies when reflow processing is added, and cost reduction can be attained. Further, it is more desirable if glass having higher softening temperature is used.

In the above image pickup lens, each of the lens portions 1a, 1b, 2a and 2b preferably comprises a resin material. When all of the lens portions are made of resin material, moldability becomes better in comparison with an occasion of using glass, and cost reduction can be attained.

Further, it is more preferable that the resin material comprises a curable resin material.

By constituting all of the lens portions with a resin material of a hardening type, it becomes possible to cure a large amount of lens portions simultaneously on a wafer-shaped lens substrate by means of a mold through various methods. Thereby, its mass productivity can be improved.

The curable resin material in this case means a resin material that is cured by heat and a resin material that is cured by light. Meanwhile, it is desirable that the curable resin material is composed of a UV curing resin material. When employing a UV curing resin material, curing time can be shortened, and mass productivity can be improved. Furthermore, in recent years, there have been developed resins excellent in terms of heat resistance and curable resin materials, which can withstand reflow processing.

It is further preferable that inorganic microparticles of a size of 30 nanometers or less are dispersed in the resin material.

By dispersing the inorganic microparticles having a particle size of 30 nanometer or less in a lens portion that is composed of a resin material, it is possible to reduce deterioration of its property and to reduce fluctuations of an image point, even when a temperature is changed. It is further possible to offer an image pickup lens having an excellent optical property in spite of environmental changes, without lowering the light transmittance.

In general, if fine particles are mixed in a transparent resin material, light scatters therein and it causes lowered transmittance. Therefore, it has been difficult to use such a material as an optical material. However, by making a size of microparticles to be smaller than a wavelength of a transmitting light flux, occurrence of light scattering can be prevented substantially.

Further, though it has been a drawback of resin material that its refractive index is lower than that of glass material, it has found that the refractive index can be made to be high, by dispersing inorganic particles having high refractive index in a resin material representing base material. Specifically, it is possible to offer the material having an arbitral refractive index, by dispersing inorganic particles of a size of 30 nanometer or less, preferably of 20 nanometer or less, more preferably 15 nanometer or less, into a plastic material serving as a base material.

The refractive index of a resin material is lowered if a temperature rises. However, when there are prepared inorganic particles whose refractive index rises if a temperature rises, and when the inorganic particles are dispersed in the resin material serving as a base material, properties of both parties act on each other to cancel, thus, fluctuations of refractive index for temperature changes can be made small. Further, on the contrary, when there are prepared inorganic particles whose refractive index declines if a temperature rises, and when the inorganic particles are dispersed in the resin material serving as a base material, fluctuations of refractive index for temperature changes can be made to be large. Specifically, it is possible to offer materials having arbitral temperature-dependency, by dispersing inorganic particles of a particle size of 30 nanometer or less, preferably 20 nanometer or less, more preferably 15 nanometer or less, into a plastic material serving as a base material.

For example, when inorganic particles such as aluminum oxide ($Al_2O_3$) or lithium niobate ($LiNbO_3$) are dispersed in an acrylic resin, it is possible to obtain a plastic material having high refractive index and to make fluctuations of changes in refractive index for temperature changes to be small.

Next, refractive index change A due to temperature will be explained in detail as follows. The refractive index change A due to temperature is expressed by the following expression by differentiating a refractive index with respect to temperature t, based on Lorentz-Lorenz equation.

$$A = \frac{(n^2+2)(n^2-1)}{6n}\left\{(-3\alpha) + \frac{1}{[R]}\frac{\partial [R]}{\partial t}\right\} \quad (8)$$

In the expression above, $\alpha$ represents the coefficient of linear expansion, and [R] represents molecular refraction.

In the case of resin materials, a contribution of the second term to the refractive index change is generally smaller than that of the first term in the expression, and it can be mostly neglected. For example, in the case of PMMA resins, coefficient of linear expansion a is $7\times10^{-5}$. When it is substituted in the aforesaid expression, $dn/dt=-1.2\times10^{-4}$ [/° C.] holds to agree generally with actual measurements.

In this case, by dispersing fine particles in a resin material, or by dispersing inorganic microparticles in a resin material desirably, the contribution of the second term in the aforesaid expression is made to be substantially large so that it may offset with a change by linear expansion of the first term each other. Specifically, it is desirable that the change which has been about $-1.2\times10^{-4}$ is controlled to be less than $8\times10^{-5}$ in an absolute value.

It is further possible to exhibit a temperature dependency which is opposite to that of a resin material representing a base material, by further increasing the contribution of the second term. In other words, it is also possible to obtain a raw material whose refractive index is raised rather than declined when temperature rises.

A mixing ratio of the particles can be varied properly for controlling a change rate of a refractive index for temperature, and it is also possible to disperse inorganic particles such that plural types of particles in nano-sizes are blended.

It is preferable that the above image pickup lens further comprises a spacer which seals a space between the first lens substrate and the second lens substrate or between the first lens block and the second lens block. By sealing a space between the first lens substrate and the second lens substrate or between the first lens block and the second lens block with the spacer, it prevents contamination such as dust from entering between the first lens block and the second lens block. The spacer fixes the space between the first lens block and the second lens block in such the structure. Thereby, adjustment between the lens blocks and assembly of them are easily enabled.

Further, an image pickup lens having the aforesaid structure can be manufactured by a method that manufactures plural lens portions for forming an image of a photographic object and plural lens units including the lens portions. Specifically, the method includes a step of sealing the space between the lens substrates with a spacer formed in a grid shape, and a step of cutting the integrated lens substrates and the spacer along the grid of the spacer. The manufacturing method of this kind is one that is consistent with an object of the present invention, which makes it possible to manufacture inexpensive image pickup lenses on a mass production basis.

Another embodiment of the invention is an image pickup apparatus comprising any one of the above image pickup lenses. It can provide an image pickup apparatus with high property in a lower cost.

The other embodiment of the invention is a mobile terminal comprising the above image pickup apparatus. It can provide a mobile terminal with high property in a lower cost.

Further, it is preferable that the image pickup lens satisfies the following conditional expression (6).

$$Ar/TL<0.4 \quad (6)$$

In the expression, Ar represents an air distance between the first lens block and the second lens block in the optical system, and TL represents a total length of the optical system. The total length of the optical system is a distance on the optical axis from a lens surface closest to a photographic object to a focal point at the image side. When a parallel flat plate is arranged between a lens surface closest to the image side and a focal point at the image side, a space of the parallel flat plate is regarded as a length in terms of air.

By satisfying the conditional expression (6), it is possible to reduce an amount of gas contained between lens blocks. Due to this, even when the image pickup lens in reflow processing is placed under the environment of high temperature as high as 250° C.-280° C., it is possible to prevent lens blocks from damage caused by high pressure against the sealed camera module resulted from expansion of gas contained in the space between lens blocks.

It is desirable that the lens portion 1a and the first lens substrate satisfy the following conditional expression (7).

$$n1/n1a<1.0 \quad (7)$$

In the expression, n1a represents a refractive index of the lens portion 1a, and n1 represents a refractive index of the first lens substrate.

When the value of the conditional expression (7) is lowered than the upper limit, a beam entering the lens substrate from the lens portion does not cause the total reflection, and ghost and flare can be controlled. In particular, when the reflection at the position near the object side causes an unwanted light to arrive at the solid-state imaging device, the beam is spread over on the whole solid-state imaging device, and image contrast is lowered. By controlling this, high image quality can be maintained even under the situation where an unwanted light has been caused in the prior art.

According to these embodiments, it is possible to provide an image pickup lens, and an image pickup apparatus and a mobile terminal employing the image pickup lens. By providing the image pickup lens as an optical system which exhibits less deterioration in terms of lens property despite high heating resistance and manufacturing errors, mass production of image pickup lenses as wafer-scale lenses is realized. It allows to provide compact image pickup lenses with excellent aberration performance in reduced cost.

Figure 1:
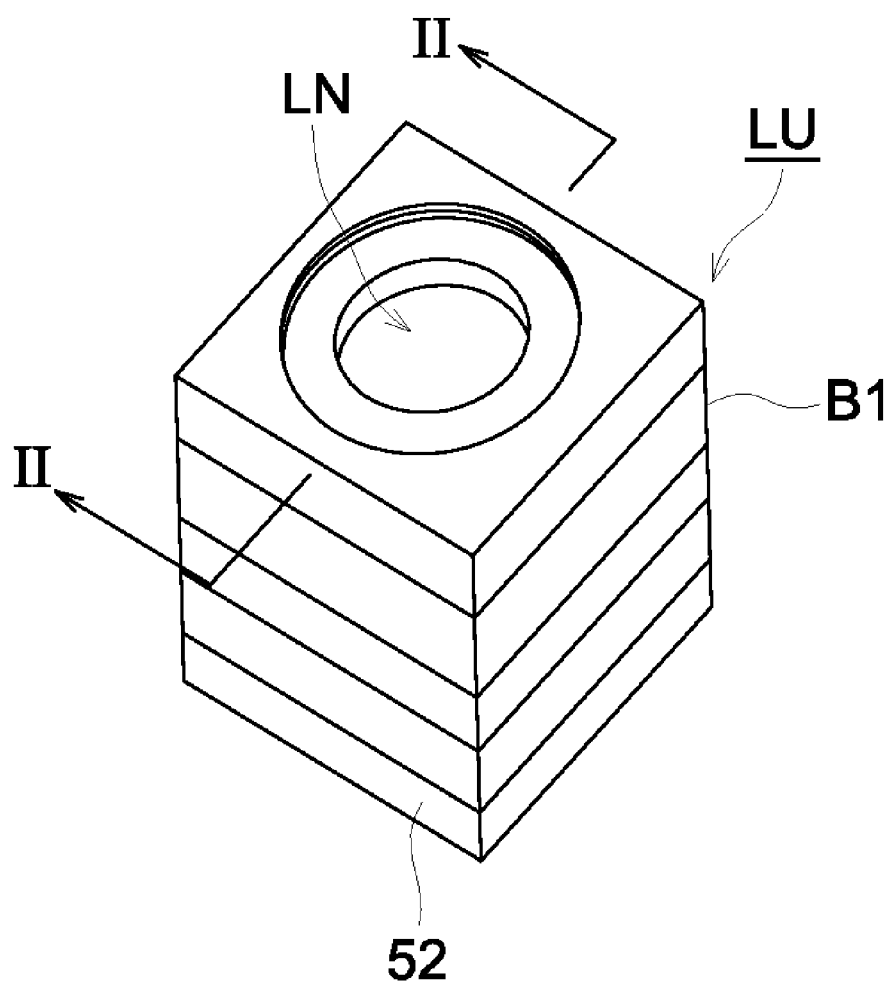
FIG. 1 is a perspective view of image pickup apparatus LU relating to the present embodiment.
Figure 2:
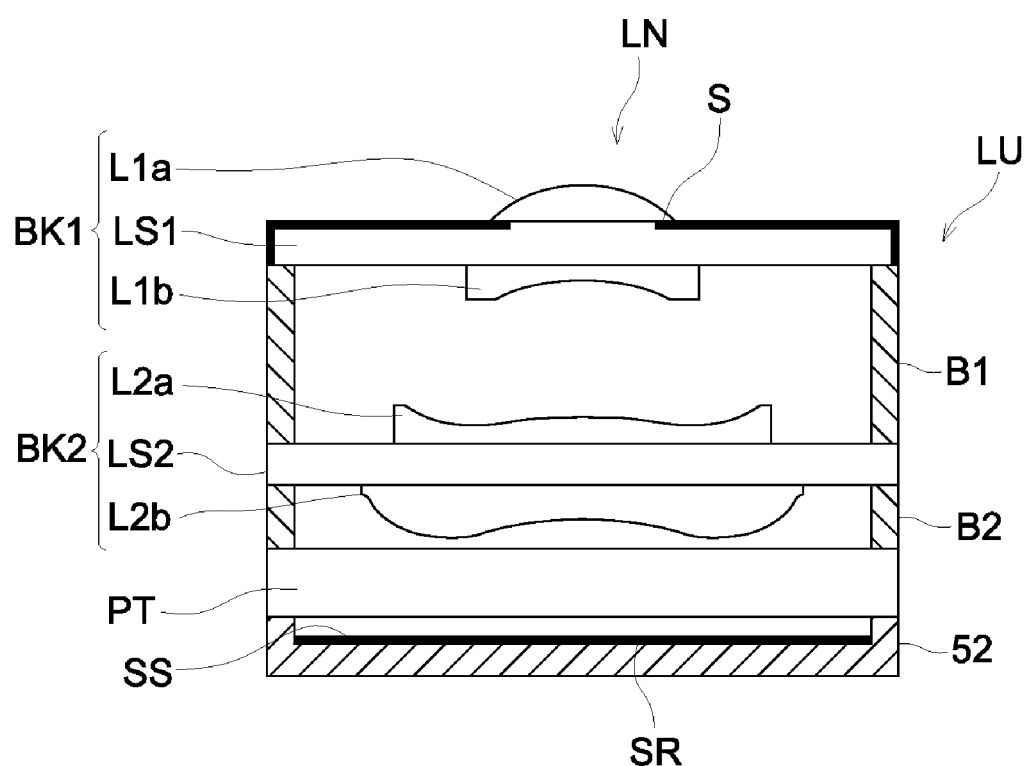
FIG. 2 is a cross-sectional view of the composition shown in FIG. 1 which is taken following arrows II-II and are viewed in the direction of the arrows.

A preferred embodiment of the invention will be explained as follows, based on drawings. FIG. 1 is a perspective view of image pickup apparatus LU relating to the present embodiment, and FIG. 2 is a cross-sectional view of the compositions shown in FIG. 1 which are taken on arrows II-II and are viewed in the direction of the arrows. As shown in FIG. 2, image pickup apparatus LU is equipped with image sensor SR of a CMOS type representing a solid-state imaging device, image pickup lens LN and with substrate 52, which are formed in one body. The image sensor SR of a CMOS type representing a solid-state imaging device includes photoelectric converting section 51a. The image pickup lens LN forms an image of a photographic object on photoelectric converting section (light-receiving surface) SS of the image sensor SR. The substrate 52 holds image sensor SR and includes an external connecting terminal (not shown) that conducts transmission and reception of electric signal. Incidentally, the image pickup lens LN includes first lens block BK1 and second lens block BK2 in this order from the object side (upper part in FIG. 2). Each of these lens blocks BK1 and BK2 is constructed, for example, by put lenses L (lenses L1a, L1b, L2a, and L2b in FIG. 2) on opposing surfaces (the object side surface and the image side surface of the lens substrate) of lens substrates LS (lens substrates LS1 and LS2 in FIG. 2). Each of the lenses L has a positive power or negative power. Incidentally, "put on" means to adhere the surface of the lens substrate LS and the lens L directly, or to indirectly adhere them with interposition of another member.

The image sensor SR includes photoelectric converting section SS representing a light-receiving section on the central portion of a plane surface on the light-receiving side of the image sensor SR. On the photoelectric converting section SS, pixels (photoelectric converting elements) are arranged on a two-dimensional basis. The photoelectric converting section is connected to an unillustrated signal processing circuit. The signal processing circuit of this kind is composed of a drive circuit that obtains signal electric charges by driving respective pixels in succession, A/D converting section that converts each signal electric charge into digital signal and of a signal processing section that forms an output of image signal by using the digital signal. Further, many pads (not shown) are arranged in the vicinity of an outer edge of the plane surface on the light-receiving side of the image sensor SR, and they are connected to substrate 52 through an unillustrated wire. The image sensor SR converts signal electric charges coming from photoelectric converting section 51a into image signal such as digital YUV signal, and outputs the signal to a prescribed circuit on the substrate 52 through a wire (not shown). In this case, Y represents a luminance signal, U (=R−Y) represents color difference signal between red signal and a luminance signal and V (=B−Y) represents color difference signal between blue signal and a luminance signal. Meanwhile, a solid-state imaging device is not limited to the aforesaid image sensor of a CMOS type, and others such as CCD or the like can be used.

Substrate 52 that supports the image sensor SR is connected to be capable of communicating with the image sensor SR.

The substrate 52 is connected to an external circuit (for example, a control circuit provided on an upper device of a mobile terminal on which an image pickup apparatus is mounted) through an unillustrated external connecting terminal, to make it possible to receive the supply of voltage for driving image sensor SR from an external circuit and of clock signal, and to output digital YUV signal to external circuits.

An upper portion of the image sensor SR is sealed by plate PT such as an infrared blocking filter fixed on the upper surface of the substrate 52. On the upper surface of the plate PT, there is fixed a bottom edge of spacer member B2. Further, the second lens block BK2 is fixed on an upper edge of the spacer member B2, a bottom edge of another spacer member B1 is fixed on the upper surface of the second lens block BK2 and the first lens block BK1 is fixed on an upper edge of the spacer member B1.

The first lens block BK1 is composed of first lens substrate LS1 that is made of glass and is a parallel flat plate, and of lens portions L1a and L1b adhered respectively on the object side and on the image side of the first lens substrate. The second lens block BK2 is composed of the second lens substrate LS2 that is made of glass and is a parallel flat plate, and of lens portions L2a and L2b adhered respectively on the object side and on the image side of the second lens substrate. The first lens block BK1 has positive refractive power, while, the second lens block BK2 has positive or negative refractive power. The first lens substrate LS1 is different from lens portions L1a and L1b in terms of at least one of a refractive index and Abbe number. The second lens substrate LS2 is different from lens portions L2a and L2b in terms of at least one of a refractive index and Abbe number.

In the first lens block BK1, the object side surface of lens portion 1a (L1a) formed on the object side surface of the first lens substrate LS1 has a form of convex surface facing the object side. Further, the image side surface of lens portion 1b (L1b) formed on the image side surface of the first lens substrate LS1 has a form of a concave surface facing the image side. In the structure, an aperture stop S can be provided by forming a light shielding film on the object side surface of the first lens substrate LS1, and providing a circular aperture through which a beam can be transmitted, at its central portion. However, the invention is not limited to the structure.

In the second lens block BK2, the object side surface of lens portion 2a (L2a) formed on the object side surface of the second lens substrate LS2 has a form of a convex surface facing the object side. The image side surface of lens portion 2b (L2b) formed on the image side surface of the second lens substrate LS2 has a form of a concave surface form facing the image side.

The image pickup lens LN satisfies the following expressions.

$$0.4 < f1a/f < 0.9 \quad (1)$$

$$-3.0 < f2b/f < -0.5 \quad (2)$$

In the expression, f1a is a focal length of the lens portion 1a (L1a) in the air, f2b is a focal length of the lens portion 2b (L2b) in the air, and f is a composite focal length of a total system of the image pickup lens.

The image pickup lens LN further satisfies the following expression.

$$-1.5 < r1b/((1-n1b)) \cdot f) < -0.7 \quad (3)$$

In the expression, r1b is a curvature radius of the image side surface of the lens portion 1b (L1b), n1b is a refractive index of the lens portion 1b (L1b) at d line, and f is the composite focal length of the total system of the image pickup lens.

In the image pickup lens LN, the object side surface of the lens portion 2a (L2a) in the lens block BK2 is in an aspheric shape which are formed in a convex surface facing the object side around an optical axis, and are formed in a concave surface facing the object side on a peripheral area which crosses with a principal ray at a maximum image height.

The image pickup lens LN further satisfies the following expression.

$$0 < v1a - v1b < 40 \quad (4)$$

In the expression, v1a is an Abbe number of the lens portion 1a (L1a), and v1b is an Abbe number of the lens portion 1b (L1b).

The image pickup lens LN further satisfies the following expression.

$$0 < f1/|f2| < 0.3 \quad (5)$$

In the expression, f1 is a composite focal length of the first lens block and t2 is a composite focal length of the second lens block.

The image pickup lens LN further includes an aperture stop arranged on the first lens substrate.

It is preferable that at least one of the lens portions L1a, L1b, L2a and L2b are formed of a UV curing resin material in which inorganic microparticles of a size of 30 nm or less are dispersed.

In general, image pickup lens LN is suitable to be used for a digital equipment (for example, a mobile terminal) equipped with an image input function, because the digital equipment including a combination of an image pickup lens and an image pickup element can serve as an image pickup apparatus that takes images of photographic objects therein and outputs them as electric signal.

An image pickup apparatus is a primary constituting factor (an optical apparatus) of a camera that takes a still image and a video of a photographic object, and it includes, for example, an image pickup lens that forms an optical image of a photographic subject and an image pickup element that converts optical images formed by the image pickup lens into electric signal, in this order from the object (namely, photographic subject) side.

As an example of a camera, a digital camera, a video camera, a security camera, an on-vehicle camera and a video phone camera are cited. Further, the camera may also be built in or be attached on a personal computer, a mobile terminal (for example, a compact and portable information equipment terminal such as a cell-phone and a mobile computer), a peripheral of the aforesaid equipment (a scanner and a printer or the like) and other digital equipment.

As is understood from these examples, loading of an image pickup apparatus constructs not only a camera but also various types of equipment having functions of a camera. For example, a digital equipment having an image inputting function such as a cell-phone equipped with a camera is constructed.

Figure 3:
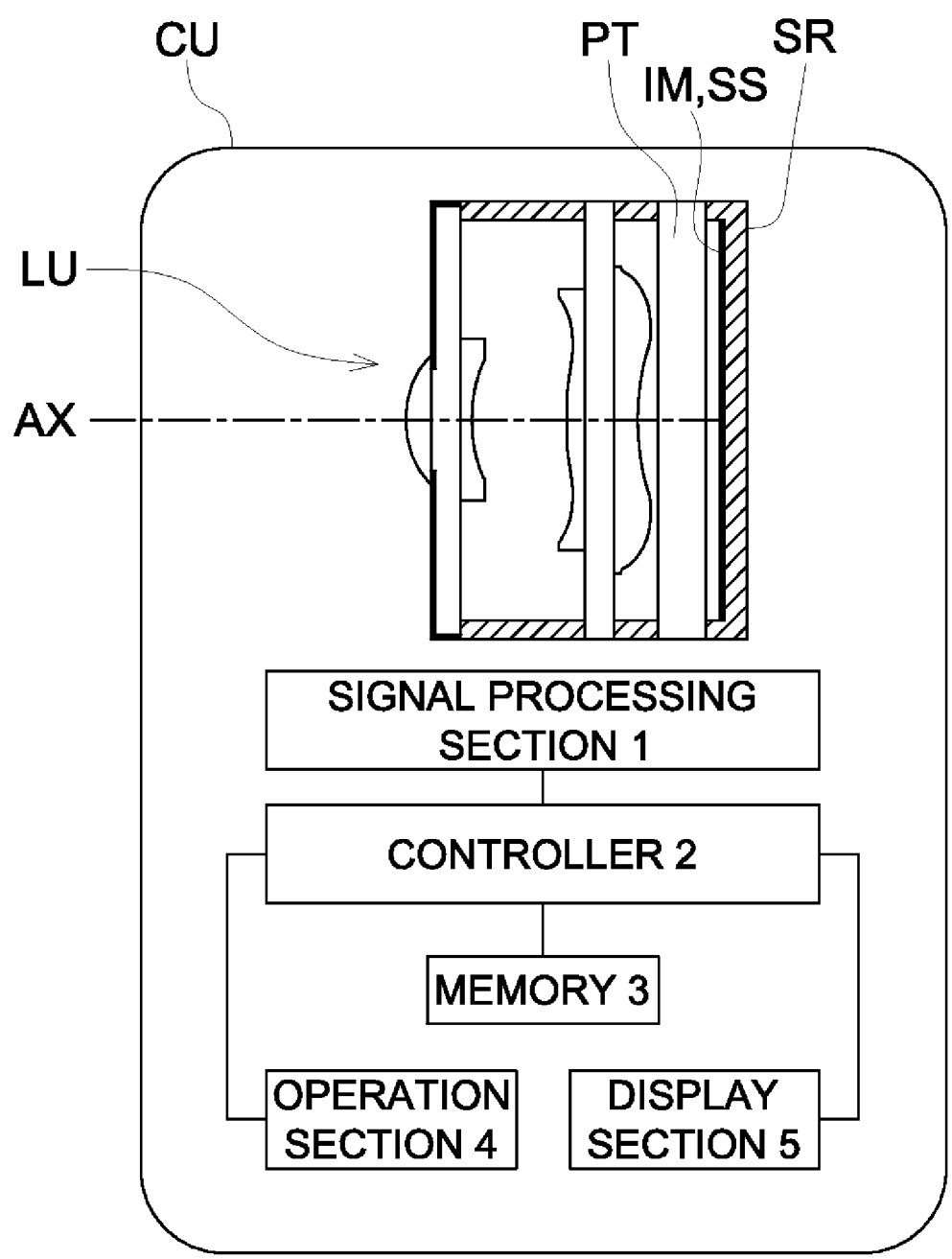
FIG. 3 is a diagram showing the state where a mobile terminal is equipped with image pickup apparatus LU.

FIG. 3 is a block diagram of mobile terminal CU that is an example of a digital equipment having an image inputting function. Image pickup apparatus LU loaded in the mobile terminal CU in FIG. 3 includes image pickup lens LN, parallel flat plate PT and image sensor SR (image pickup lens LN sometimes includes parallel flat plate).

The image pickup lens LN forms an optical image of an object (image surfaces) IM. In detailed explanations, the image pickup lens LN includes, for example, lens blocks BK1 and BK2 in the order from the object (namely, a photographic subject), and forms optical images IM on light-receiving surface SS of image sensor SR.

Incidentally, optical image IM that is to be formed by the image pickup lens LN passes through, for example, an optical lowpass filter (parallel flat plate PT in FIG. 3) having prescribed cut-off frequency characteristic determined by a pixel pitch of image pickup element SR. Its spatial frequency characteristic is adjusted so that a so-called folding noise generated when an image is converted into electric signal may be minimized to after this passage.

Then, occurrence of color moire is controlled by this adjustment of the spatial frequency characteristic. However, if performances at a frequency around the resolution limit has been controlled, noises are not generated even when an optical lowpass filter is not used. Further, when a user takes or views a photograph by using a display system having a less noise (for example, a liquid crystal screen of a cell-phone), no optical lowpass filter is needed.

The parallel flat plate PT is an optical filter arranged in case of need, such as an optical lowpass filter and an infrared blocking filter (incidentally, the parallel flat plate PT sometimes corresponds to a cover glass of image sensor SR).

The image sensor SR converts an optical image IM which is formed on light-receiving surface SS by image pickup lens LN, into electric signal. For example, as an image pickup element (a solid-state imaging device), there are given an image sensor of a CCD (Charge Coupled Device) type and an image sensor of a CMOS (Complementary Metal-Oxide Semiconductor) type each having a plurality of pixels thereon. Meanwhile, the image pickup lens LN is positioned so that optical image IM of a photographic subject may be formed on light-receiving surface SS of image sensor SR. Therefore, optical images IM formed by the image pickup lens LN are converted efficiently into electric signal.

When image pickup apparatus LU of this kind is loaded in mobile terminal CU having image inputting functions, image pickup apparatus LU is generally arranged in the inside of a body of the mobile terminal CU. However, when camera functions are exhibited by mobile terminal CU, image pickup apparatus LU takes a form that is required. For example, unitized image pickup apparatus LU may be mounted on or dismounted from a main body of mobile terminal CU freely, or it may be freely rotatable for a main body of mobile terminal CU.

The mobile terminal CU includes signal processing section 1, controller 2, memory 3, operation section 4 and display section 5, in addition to the image pickup apparatus LU.

The signal processing section 1 conducts, for example, prescribed digital image processing and image compression processing, for signal generated by image sensor SR, as occasion demands. Then, the processed signal is recorded in memory 3 (semiconductor memory and optical disc) as digital image signal, or are converted into infrared radiation signal through cables to be transmitted to other equipment.

The controller 2 is a microcomputer which conducts intensively function control for image pickup function and image reproducing function. For example, the controller 2 controls image pickup apparatus LU so that at least one of shooting still images of a photographic subject and shooting video of a photographic subject may be conducted.

The memory 3 stores, for example, signal which has been generated by image pickup element SR and have been processed by signal processing section 1.

The operation section 4 is a portion including operating members such as an operation button (for example, a release button) and an operation dial (for example, a photographing mode dial), and it transmits information operated and inputted by an operator to the controller 2.

The display section 5 is a portion including a display such as a liquid crystal monitor, and it displays images by using image signal converted by image sensor SR or by using image information recorded in memory 3.

A manufacturing method for image pickup lens LN will be explained as follows. Lens block unit UT includes plural lens blocks BK which are arrayed as shown in a cross-sectional view in FIG. 4a. The Lens block unit UT is manufactured, for example, by a reflow method or replica method that can manufacture many lenses simultaneously at low cost. Incidentally, the number of lens blocks BK included in lens block unit UT may either be single or be plural.

In the reflow method, glass having a low softening temperature is deposited on a glass substrate through a CVD (Chemical Vapor Deposition) method. Then, the deposited low softening temperature glass is processed through lithography and through dry etching. Furthermore, the deposited low softening temperature glass is melted by further heating to become a shape of lenses. In other words, many lenses are manufactured simultaneously on the glass substrate in this reflow method.

Further, in the replica method, curable resin material is transferred on a glass substrate to form a lens shape with a mold. Owing to this, many lenses are manufactured simultaneously on a glass substrate in the replica method.

Then, image pickup lens LN is manufactured from the lens block units UT that are manufactured by the aforesaid methods. An example of the manufacturing process for the image pickup lens is shown on a schematic sectional diagram in FIG. 4b.

The first lens block unit UT1 is composed of first lens substrate LS1 which is formed in a parallel flat plate, lens portions 1a (L1a) adhered to a plane on one side of the first lens substrate LS1 and of lens portions 1b (L1b) adhered to a plane on the other side.

The second lens block unit UT2 is composed of second lens substrate LS2 which is formed in a parallel flat plate, lens portions 2a (L2a) adhered to a plane on one side of the second lens substrate LS2 and of lens portions 2b (L2b) adhered to a plane on the other side.

A spacer member (spacer) B1 in a grid shape lies between the first lens block unit UT1 and the second lens block unit UT2 (specifically, between the first lens substrate LS1 and the second lens substrate LS2) to keep a distance between lens block units UT1 and UT2 to be constant. Further, spacer member B2 lies between parallel flat plate PT and the second lens block unit 2 to keep a distance between parallel flat plate PT and lens block unit UT2 to be constant (in other words, spacer members B1 and B2 can be said a two-step lattice). Then, respective lens portions 1a and 2b (L1a through L2b) are positioned in holes of the grid of spacer members B1 and B2.

Meanwhile, parallel flat plate PT is a wafer-level chip-size package for a sensor including a microlens array, or a parallel flat plate such as a sensor cover glass or an infrared blocking filter (which correspond to parallel flat plate PT in FIG. 3).

When spacer member B1 lies between the first lens block unit UT1 and the second lens block unit UT2, and when spacer member B2 lies between the second lens unit UT2 and the parallel flat plate PT, both lens substrates (first lens substrate LS1 and second lens substrate LS2) are sealed and integrated together.

Then, when a body in which the first lens substrate LS1 and the second lens substrate LS2, the spacer members B1 and B2, and the parallel flat plate PT are integrated, are cut along the grid frames (a position shown with broken lines) of the spacer members B1 and B2, a plurality of image pickup lenses LN each being of a two-element structure are obtained as shown in FIG. 4c.

As stated above, when a member wherein plural lens blocks (first lens block BK1 and second lens block BK2) are incorporated is cut off, image pickup lenses LN can be manufactured. Thus, adjustment for a lens distance and assembling of lenses for each image pickup lens LN are not needed, which makes mass production of image pickup lenses LN possible.

In addition, each of spacer members B1 and B2 is in a grid form. Therefore, each of spacer members B1 and B2 serves also as a mark for cutting image pickup lenses LN out from the integrated member in which plural lens blocks BK1 and BK2 are incorporated. Therefore, image pickup lens LN can be easily cut out from the member in which plural lens blocks BK1 and BK2 are incorporated, which is not time-consuming. As a result, image pickup lenses can be manufactured at low cost on a mass production basis.

When the foregoing is considered, the manufacturing method for image pickup lens LN includes a jointing process to joint plural lens block units UT1 and UT2 through spacer member B by arranging spacer member B1 to touch with at least a part of the fringes of lens blocks BK1 and BK2, and a cutting process to cut the jointed lens block units UT1 and UT2 along the spacer member B1. Such the manufacturing method is suitable for mass production of inexpensive lens systems.

EXAMPLES

Examples suitable to the above embodiments will be shown below. However, the scope of the invention is not limited to the following examples. Symbols used in each of Examples are as follows:

f: focal length of the total system of the image pickup lens
fB: back focus
F: F number
2Y: Diagonal length of image pickup surface of solid-state image pickup element (Diagonal length on rectangular effective pixel area of solid-state image pickup element)
ENTP: Entrance pupil position (Distance from the first surface to entrance pupil position)
EXTP: Emergence pupil position (Distance from image plane to the emergence pupil position)
H1: Front side principal point position (Distance from the first surface to front side principal point position)
H2: Rear side principal point position (Distance from the last surface to rear side principal point position)
R: Curvature radius of refractive surface
D: Surface distance on the optical axis
Nd: Refractive index of lens material at normal temperature for d-line
vd: Abbe number of lens material As for a focal length of the each lens portion, a lens portion formed on the object side surface of the lens substrate provides a focal length in case that the object side and image side of the lens are filled with the air. Meanwhile, a lens portion formed on the image side surface of the lens substrate provides a focal length in case that the object side and image side of the lens is filled with the air.

In each Example, the shape of the aspheric surface is expressed by the following expression (9), where X-axis extends along the optical axis direction, the top of the surface is on the origin, and the height perpendicular to the optical axis is h.

$$X = \frac{h^2/R}{1 + \sqrt{1 - (1+K)h^2/R^2}} + \sum A_i h^i \quad (9)$$

In the aforesaid expression, Ai represents $i^{th}$ order aspheric surface coefficient, R represents a curvature radius and K represents a conic constant.

In the following description (including lens data in Tables), an exponent for 10 is assumed to be expressed by using E (for example, 2.5×10−02 is expressed by 2.5E−02). Further, surface numbers in lens data are numbered by assuming the surface of the first lens facing the object as the first surface. Incidentally, each of all units of numerical values indicating lengths described in the Examples is mm.

Example 1

Lens data in Example 1 are shown in Table 1. FIG. 5 is a cross-sectional view of a lens in Example 1. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side, in this order from the object side. In addition, all surfaces of lens portions which touch with the air are in a form of an aspheric surface. The first lens block BK1 has positive refractive power, while the second lens block BK2 has negative refractive power.

TABLE 1

Example 1
f = 2.90 mm fB = 0.23 mm F = 2.88 2Y = 3.5 mm
ENTP = 0.18 mm EXTP = −1.81 mm H1 = −1.04 mm H2 = −2.67 mm

| Surface No. | R (mm) | D (mm) | Nd | vd | Effective radius (mm) |
|---|---|---|---|---|---|
| 1* | 0.932 | 0.25 | 1.5130 | 55 | 0.53 |
| 2 (Diaphragm) | ∞ | 0.30 | 1.4700 | 65 | 0.48 |
| 3 | ∞ | 0.11 | 1.5720 | 35 | 0.51 |
| 4* | 1.813 | 0.95 | | | 0.55 |
| 5* | 2.190 | 0.19 | 1.5720 | 35 | 1.12 |
| 6 | ∞ | 0.30 | 1.4700 | 65 | 1.26 |
| 7 | ∞ | 0.23 | 1.5720 | 35 | 1.48 |
| 8* | 1.732 | 0.20 | | | 1.50 |
| 9 | ∞ | 0.50 | 1.5163 | 64 | 1.75 |
| 10 | ∞ | 0.23 | | | 1.75 |

| Aspheric surface coefficient | |
|---|---|
| $1^{st}$ surface | K = 0.96957E−01 |
| | A4 = 0.41805E−01 |
| | A6 = −0.89339E−01 |
| | A8 = 0.52932E+00 |
| $4^{th}$ surface | K = 0.85530E+01 |
| | A4 = 0.13231E+00 |
| | A6 = −0.11205E+01 |
| | A8 = 0.77847E+01 |
| | A10 = −0.16966E+02 |
| $5^{th}$ surface | K = −0.43973E+02 |
| | A4 = 0.14086E+00 |
| | A6 = −0.65644E+00 |
| | A8 = 0.85453E+00 |

TABLE 1-continued

Example 1
f = 2.90 mm fB = 0.23 mm F = 2.88 2Y = 3.5 mm
ENTP = 0.18 mm EXTP = −1.81 mm H1 = −1.04 mm H2 = −2.67 mm

| | |
|---|---|
| | A10 = −0.57420E+00 |
| | A12 = 0.15055E+00 |
| | A14 = 0.10404E−02 |
| | A16 = −0.82412E−03 |
| 8th surface | K = −0.13068E+02 |
| | A4 = 0.28672E−01 |
| | A6 = −0.14556E+00 |
| | A8 = 0.68155E−01 |
| | A10 = −0.41885E−02 |
| | A12 = −0.93538E−02 |
| | A14 = 0.26924E−02 |
| | A16 = −0.10940E−03 |

Lens block data

| Lens block | Starting surface | End surface | Focal length (mm) |
|---|---|---|---|
| 1 | 1 | 4 | 3.22 |
| 2 | 5 | 8 | −34.82 |

FIGS. 6a, 6b and 6c are aberration diagrams of an image pickup lens in Example 1 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 2

Lens data in Example 2 are shown in Table 2. FIG. 7 is a cross-sectional view of a lens in Example 2. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side, in this order from the object side. In addition, all surfaces of lens portions which touch with the air are in a form of an aspheric surface. The first lens block BK1 has positive refractive power, while the second lens block BK2 has negative refractive power.

TABLE 2

Example 2
f = 2.93 mm fB = 0.30 mm F = 2.88 2Y = 3.5 mm
ENTP = 0.19 mm EXTP = −1.78 mm H1 = −1.01 mm H2 = −2.63 mm

| Surface No. | R (mm) | D (mm) | Nd | vd | Effective radius (mm) |
|---|---|---|---|---|---|
| 1* | 0.934 | 0.25 | 1.5130 | 55 | 0.54 |
| 2 (Diaphragm) | ∞ | 0.35 | 1.4700 | 65 | 0.48 |
| 3 | ∞ | 0.05 | 1.5900 | 30 | 0.51 |
| 4* | 1.785 | 0.99 | | | 0.53 |
| 5* | 1.664 | 0.14 | 1.5670 | 38 | 1.19 |
| 6 | ∞ | 0.30 | 1.4700 | 65 | 1.26 |
| 7 | ∞ | 0.16 | 1.5670 | 38 | 1.47 |
| 8* | 1.400 | 0.20 | | | 1.50 |
| 9 | ∞ | 0.50 | 1.5163 | 64 | 1.75 |
| 10 | ∞ | 0.30 | | | 1.75 |

Aspheric surface coefficient

| | |
|---|---|
| 1st surface | K = −0.28921E+00 |
| | A4 = 0.10354E−01 |
| | A6 = 0.13115E+01 |
| | A8 = −0.11154E+02 |
| | A10 = 0.59070E+02 |
| | A12 = −0.16371E+03 |
| | A14 = 0.18515E+03 |
| 4th surface | K = 0.84365E+01 |
| | A4 = −0.29409E−01 |
| | A6 = 0.14598E+01 |
| | A8 = −0.75399E+01 |
| | A10 = −0.79715E+01 |
| | A12 = 0.15651E+03 |
| | A14 = −0.33784E+03 |
| 5th surface | K = −0.23616E+02 |
| | A4 = 0.14685E+00 |
| | A6 = −0.64975E+00 |
| | A8 = 0.85785E+00 |
| | A10 = −0.56879E+00 |
| | A12 = 0.15928E+00 |
| | A14 = −0.93708E−02 |
| 8th surface | K = −0.10418E+02 |
| | A4 = 0.23581E−01 |
| | A6 = −0.15025E+00 |
| | A8 = 0.79662E−01 |
| | A10 = −0.35254E−02 |
| | A12 = −0.12075E−01 |
| | A14 = 0.29288E−02 |

Lens block data

| Lens block | Starting surface | End surface | Focal length (mm) |
|---|---|---|---|
| 1 | 1 | 4 | 3.35 |
| 2 | 5 | 8 | −103.23 |

FIGS. 8a, 8b and 8c are aberration diagrams of an image pickup lens in Example 2 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 3

Lens data in Example 3 are shown in Table 3. FIG. 9 is a cross-sectional view of a lens in Example 3. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side in this order from the object side. In addition, all surfaces of lens portions which touch with the air are in a form of an aspheric surface. The first lens block BK1 has positive refractive power, while the second lens block BK2 has negative refractive power.

TABLE 3

Example 3
f = 2.98 mm fB = 0.36 mm F = 2.88 2Y = 3.5 mm
ENTP = 0.20 mm EXTP = −1.86 mm H1 = −0.82 mm H2 = −2.62 mm

| Surface No. | R (mm) | D (mm) | Nd | νd | Effective radius (mm) |
|---|---|---|---|---|---|
| 1* | 0.919 | 0.27 | 1.5400 | 41 | 0.55 |
| 2 (Diaphragm) | ∞ | 0.32 | 1.4700 | 65 | 0.49 |
| 3 | ∞ | 0.05 | 1.5800 | 29 | 0.51 |
| 4* | 1.549 | 0.84 | | | 0.51 |
| 5* | 3.274 | 0.08 | 1.5800 | 29 | 0.99 |
| 6 | ∞ | 0.37 | 1.4700 | 65 | 1.05 |
| 7 | ∞ | 0.29 | 1.5800 | 29 | 1.29 |
| 8* | 2.952 | 0.20 | | | 1.37 |
| 9 | ∞ | 0.50 | 1.5163 | 64 | 1.75 |
| 10 | ∞ | 0.36 | | | 1.75 |

Aspheric surface coefficient

| | |
|---|---|
| $1^{st}$ surface | K = 0.32759E+00 |
| | A4 = −0.72183E−01 |
| | A6 = 0.15957E+01 |
| | A8 = −0.15717E+02 |
| | A10 = 0.74514E+02 |
| | A12 = −0.18079E+03 |
| | A14 = 0.18174E+03 |
| $4^{th}$ surface | K = 0.53153E+01 |
| | A4 = 0.31496E−01 |
| | A6 = 0.74374E+00 |
| | A8 = 0.19502E+00 |
| | A10 = −0.34868E+02 |
| | A12 = 0.19812E+03 |
| | A14 = −0.33836E+03 |
| $5^{th}$ surface | K = −0.30000E+02 |
| | A4 = −0.37043E−01 |
| | A6 = −0.48338E+00 |
| | A8 = 0.99285E+00 |
| | A10 = −0.98344E+00 |
| | A12 = 0.40932E+00 |
| | A14 = −0.38158E−01 |
| $8^{th}$ surface | K = −0.16307E+01 |
| | A4 = −0.60525E−01 |
| | A6 = −0.12847E+00 |
| | A8 = 0.89333E−01 |
| | A10 = −0.10019E−01 |
| | A12 = −0.12780E−01 |
| | A14 = 0.36040E−02 |

Lens block data

| Lens block | Starting surface | End surface | Focal length (mm) |
|---|---|---|---|
| 1 | 1 | 4 | 3.25 |
| 2 | 5 | 8 | −425.47 |

FIGS. 10a, 10b and 10c are aberration diagrams of an image pickup lens in Example 3 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 4

Lens data in Example 4 are shown in Table 4. FIG. 11 is a cross-sectional view of a lens in Example 4. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side in this order from the object side. In addition, all surfaces of lens portions which touch with the air are in a form of an aspheric surface. The first lens block BK1 has positive refractive power, while the second lens block BK2 has negative refractive power.

TABLE 4

Example 4
f = 2.96 mm fB = 0.28 mm F = 2.88 2Y = 3.5 mm
ENTP = 0.20 mm EXTP = −1.70 mm H1 = −1.26 mm H2 = −2.68 mm

| Surface No. | R (mm) | D (mm) | Nd | νd | Effective radius (mm) |
|---|---|---|---|---|---|
| 1* | 0.949 | 0.27 | 1.5130 | 55 | 0.54 |
| 2 (Diaphragm) | ∞ | 0.35 | 1.4700 | 65 | 0.48 |
| 3 | ∞ | 0.07 | 1.5900 | 30 | 0.51 |
| 4* | 1.816 | 1.00 | | | 0.58 |
| 5* | 1.420 | 0.16 | 1.5670 | 38 | 1.24 |
| 6 | ∞ | 0.30 | 1.4700 | 65 | 1.30 |
| 7 | ∞ | 0.12 | 1.5670 | 38 | 1.50 |
| 8* | 1.111 | 0.20 | | | 1.53 |
| 9 | ∞ | 0.50 | 1.5163 | 64 | 1.75 |
| 10 | ∞ | 0.28 | | | 1.75 |

Aspheric surface coefficient

| | |
|---|---|
| $1^{st}$ surface | K = −0.13855E+00 |
| | A4 = −0.22597E−01 |
| | A6 = 0.13985E+01 |
| | A8 = −0.12244E+02 |
| | A10 = 0.63957E+02 |
| | A12 = −0.17511E+03 |
| | A14 = 0.19443E+03 |
| $4^{th}$ surface | K = 0.86678E+01 |
| | A4 = −0.73416E−01 |
| | A6 = 0.17741E+01 |
| | A8 = −0.86418E+01 |
| | A10 = −0.81077E+01 |
| | A12 = 0.16156E+03 |
| | A14 = −0.33784E+03 |
| $5^{th}$ surface | K = −0.20074E+02 |
| | A4 = 0.15548E+00 |
| | A6 = −0.66387E+00 |
| | A8 = 0.88520E+00 |
| | A10 = −0.58488E+00 |
| | A12 = 0.16867E+00 |
| | A14 = −0.13380E−01 |
| $8^{th}$ surface | K = −0.95611E+01 |
| | A4 = 0.24966E−01 |
| | A6 = −0.16003E+00 |
| | A8 = 0.96080E−01 |
| | A10 = −0.12746E−01 |
| | A12 = −0.90517E−02 |
| | A14 = 0.24556E−02 |

Lens block data

| Lens block | Starting surface | End surface | Focal length (mm) |
|---|---|---|---|
| 1 | 1 | 4 | 3.37 |
| 2 | 5 | 8 | −29.61 |

FIGS. 12a, 12b and 12c are aberration diagrams of an image pickup lens in Example 4 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 5

Lens data in Example 5 are shown in Table 5. FIG. 13 is a cross-sectional view of a lens in Example 5. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side in this order from the object side. In addition, all surfaces of lens portions which touch with the air are in a form of an aspheric surface. The first lens block BK1 has positive refractive power, while the second lens block BK2 has negative refractive power.

TABLE 5

Example 5
f = 3.03 mm fB = 0.27 mm F = 2.88 2Y = 3.5 mm
ENTP = 0.17 mm EXTP = −1.82 mm H1 = −1.18 mm H2 = −2.76 mm

| Surface No. | R (mm) | D (mm) | Nd | vd | Effective radius (mm) |
|---|---|---|---|---|---|
| 1* | 0.835 | 0.24 | 1.5090 | 57 | 0.54 |
| 2 (Diaphragm) | ∞ | 0.30 | 1.4700 | 65 | 0.51 |
| 3 | ∞ | 0.16 | 1.5720 | 35 | 0.52 |
| 4* | 1.679 | 0.87 | | | 0.52 |
| 5* | 3.480 | 0.12 | 1.5140 | 54 | 0.97 |
| 6 | ∞ | 0.30 | 1.4700 | 65 | 1.08 |
| 7 | ∞ | 0.28 | 1.5720 | 35 | 1.29 |
| 8* | 2.449 | 0.20 | | | 1.37 |
| 9 | ∞ | 0.50 | 1.5163 | 64 | 1.75 |
| 10 | ∞ | 0.27 | | | 1.75 |

Aspheric surface coefficient

| | |
|---|---|
| $1^{st}$ surface | K = 0.19710E+00 |
| | A4 = −0.99608E−01 |
| | A6 = 0.17109E+01 |
| | A8 = −0.15983E+02 |
| | A10 = 0.75008E+02 |
| | A12 = −0.17427E+03 |
| | A14 = 0.15892E+03 |
| $4^{th}$ surface | K = 0.56394E+01 |
| | A4 = 0.65970E−01 |
| | A6 = 0.95592E+00 |
| | A8 = −0.40401E+00 |
| | A10 = −0.33318E+02 |
| | A12 = 0.20792E+03 |
| | A14 = −0.34535E+03 |
| $5^{th}$ surface | K = −0.30000E+02 |
| | A4 = −0.11181E+00 |
| | A6 = −0.47673E+00 |
| | A8 = 0.96714E+00 |
| | A10 = −0.96837E+00 |
| | A12 = 0.44360E+00 |
| | A14 = −0.50879E−01 |
| $8^{th}$ surface | K = −0.28053E+01 |
| | A4 = −0.93911E−01 |
| | A6 = −0.10998E+00 |
| | A8 = 0.84867E−01 |
| | A10 = −0.93611E−02 |

TABLE 5-continued

Example 5
f = 3.03 mm fB = 0.27 mm F = 2.88 2Y = 3.5 mm
ENTP = 0.17 mm EXTP = −1.82 mm H1 = −1.18 mm H2 = −2.76 mm

| | |
|---|---|
| | A12 = −0.12217E−01 |
| | A14 = 0.33943E−02 |

Lens block data

| Lens block | Starting surface | End surface | Focal length (mm) |
|---|---|---|---|
| 1 | 1 | 4 | 3.07 |
| 2 | 5 | 8 | −14.36 |

FIGS. 14a, 14b and 14c are aberration diagrams of an image pickup lens in Example 5 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 6

Lens data in Example 6 are shown in Table 6. FIG. 15 is a cross-sectional view of a lens in Example 6. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side in this order from the object side. In addition, all surfaces of lens portions which touch with the air are in a form of an aspheric surface. The first lens block BK1 has positive refractive power, while the second lens block BK2 has positive refractive power.

TABLE 6

Example 6
f = 2.87 mm fB = 0.26 mm F = 2.88 2Y = 3.5 mm
ENTP = 0.20 mm EXTP = −1.89 mm H1 = −0.77 mm H2 = −2.61 mm

| Surface No. | R (mm) | D (mm) | Nd | vd | Effective radius (mm) |
|---|---|---|---|---|---|
| 1* | 0.9248 | 0.27 | 1.5500 | 37 | 0.53 |
| 2 (Diaphragm) | ∞ | 0.32 | 1.4700 | 65 | 0.47 |
| 3 | ∞ | 0.05 | 1.5800 | 29 | 0.49 |
| 4* | 1.5613 | 0.85 | | | 0.50 |
| 5* | 3.2867 | 0.09 | 1.5700 | 33 | 0.99 |
| 6 | ∞ | 0.38 | 1.4700 | 65 | 1.07 |
| 7 | ∞ | 0.29 | 1.5800 | 29 | 1.31 |
| 8* | 3.0656 | 0.20 | | | 1.39 |
| 9 | ∞ | 0.50 | 1.5163 | 64 | 1.75 |
| 10 | ∞ | 0.26 | | | 1.75 |

Aspheric surface coefficient

| | |
|---|---|
| $1^{st}$ surface | K = 0.32446E+00 |
| | A4 = −0.67230E−01 |
| | A6 = 0.15510E+01 |

TABLE 6-continued

Example 6
f = 2.87 mm fB = 0.26 mm F = 2.88 2Y = 3.5 mm
ENTP = 0.20 mm EXTP = −1.89 mm H1 = −0.77 mm H2 = −2.61 mm

|  |  |
|---|---|
| 4$^{th}$ surface | A8 = −0.15568E+02 |
|  | A10 = 0.74562E+02 |
|  | A12 = −0.18144E+03 |
|  | A14 = 0.18202E+03 |
|  | K = 0.49793E+01 |
|  | A4 = 0.13372E−01 |
|  | A6 = 0.11720E+01 |
|  | A8 = −0.20655E+01 |
|  | A10 = −0.29280E+02 |
|  | A12 = 0.19541E+03 |
|  | A14 = −0.33778E+03 |
| 5$^{th}$ surface | K = −0.26755E+02 |
|  | A4 = −0.56915E−01 |
|  | A6 = −0.44994E+00 |
|  | A8 = 0.96297E+00 |
|  | A10 = −0.97209E+00 |
|  | A12 = 0.40037E+00 |
|  | A14 = −0.31675E−01 |
| 8$^{th}$ surface | K = −0.64458E+00 |
|  | A4 = −0.59002E−01 |
|  | A6 = −0.13552E+00 |
|  | A8 = 0.98238E−01 |
|  | A10 = −0.12854E−01 |
|  | A12 = −0.13460E−01 |
|  | A14 = 0.39380E−02 |

Lens block data

| Lens block | Starting surface | End surface | Focal length (mm) |
|---|---|---|---|
| 1 | 1 | 4 | 3.15 |
| 2 | 5 | 8 | 1321.85 |

FIGS. 16a, 16b and 16c are aberration diagrams of an image pickup lens in Example 6 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Example 7

Lens data in Example 7 are shown in Table 7. FIG. 17 is a cross-sectional view of a lens in Example 7. There are arranged first lens block BK1, second lens block BK2, and parallel flat plate PT which is assumed to be an optical low-pass filter, an infrared blocking filter and a sealing glass of solid-state imaging device, in this order from the object side. The first lens block BK1 is composed of lens portion 1a (L1a) that is convex facing the object side, aperture stop S, first lens substrate LS1 and of lens portion 1b (L1b) that is concave facing the image side in this order from the object side. The second lens block BK2 is composed of lens portion 2a (L2a) that is convex facing the object side, second lens substrate LS2, and of lens portion 2b (L2b) that is concave facing the image side in this order from the object side. In addition, all surfaces of lens portions which touch with the air are in a form of an aspheric surface. The first lens block BK1 has positive refractive power, while the second lens block BK2 has negative refractive power.

TABLE 7

Example 7
f = 2.98 mm fB = 0.23 mm F = 3.00 2Y = 3.5 mm
ENTP = 0.17 mm EXTP = −1.82 mm H1 = −1.18 mm H2 = −2.75 mm

| Surface No. | R (mm) | D (mm) | Nd | vd | Effective radius (mm) |
|---|---|---|---|---|---|
| 1* | 0.8972 | 0.23 | 1.5090 | 57 | 0.52 |
| 2 (Diaphragm) | ∞ | 0.32 | 1.4700 | 65 | 0.48 |
| 3 | ∞ | 0.17 | 1.5900 | 30 | 0.50 |
| 4* | 1.7366 | 0.90 |  |  | 0.52 |
| 5* | 2.9346 | 0.16 | 1.5700 | 32 | 1.03 |
| 6 | ∞ | 0.30 | 1.4700 | 65 | 1.14 |
| 7 | ∞ | 0.25 | 1.5710 | 35 | 1.32 |
| 8* | 2.0535 | 0.20 |  |  | 1.42 |
| 9 | ∞ | 0.50 | 1.5163 | 64 | 1.75 |
| 10 | ∞ | 0.23 |  |  | 1.75 |

Aspheric surface coefficient

|  |  |
|---|---|
| 1$^{st}$ surface | K = 0.33501E+00 |
|  | A4 = −0.99711E−01 |
|  | A6 = 0.11986E+01 |
|  | A8 = −0.13543E+02 |
|  | A10 = 0.74034E+02 |
|  | A12 = −0.19965E+03 |
|  | A14 = 0.20800E+03 |
| 4$^{th}$ surface | K = 0.45625E+01 |
|  | A4 = 0.87911E−01 |
|  | A6 = 0.81083E+00 |
|  | A8 = 0.92733E+00 |
|  | A10 = −0.35398E+02 |
|  | A12 = 0.20752E+03 |
|  | A14 = −0.35034E+03 |
| 5$^{th}$ surface | K = −0.30000E+02 |
|  | A4 = 0.13309E−01 |
|  | A6 = −0.61720E+00 |
|  | A8 = 0.10949E+01 |
|  | A10 = −0.95870E+00 |
|  | A12 = 0.42392E+00 |
|  | A14 = −0.96215E−01 |
|  | A16 = 0.14963E−01 |
| 8$^{th}$ surface | K = −0.35072E+01 |
|  | A4 = −0.69375E−01 |
|  | A6 = −0.10731E+00 |
|  | A8 = 0.79785E−01 |
|  | A10 = −0.10276E−01 |
|  | A12 = −0.10272E−01 |
|  | A14 = 0.36958E−02 |
|  | A16 = −0.32844E−03 |

Lens block data

| Lens block | Starting surface | End surface | Focal length (mm) |
|---|---|---|---|
| 1 | 1 | 4 | 3.13 |
| 2 | 5 | 8 | −17.83 |

FIGS. 18a, 18b and 18c are aberration diagrams of an image pickup lens in Example 7 respectively for spherical aberration, astigmatism and distortion. In this case, in the spherical aberration diagram, d represents an amount of spherical aberration for d line and g represents an amount of spherical aberration for g line. Further, in the astigmatism diagram, a solid line shows a saggital surface and a dotted line shows a meridional surface respectively.

Values of Examples corresponding to respective conditional expressions are shown collectively in Table 8.

TABLE 8

| Conditional expressions | Example 1 | Example 2 | Example 3 | Example 4 | Example 5 | Example 6 | Example 7 |
|---|---|---|---|---|---|---|---|
| (1) f1a/f | 0.63 | 0.62 | 0.57 | 0.62 | 0.57 | 0.59 | 0.59 |
| (2) f2b/f | −1.05 | −0.84 | −1.71 | −0.65 | −1.41 | −1.84 | −1.21 |
| (3) r1b/((1 − n1b) · f) | −1.09 | −1.03 | −0.9 | −1.03 | −0.97 | −0.94 | −0.99 |
| (4) ν1a-1bν | 20.0 | 25.3 | 12.0 | 25.3 | 22.4 | 8.0 | 27.7 |
| (5) f1/|f2| | 0.09 | 0.032 | 0.01 | 0.114 | 0.214 | 0.002 | 0.176 |
| (6) Ar/TL | 0.31 | 0.32 | 0.27 | 0.33 | 0.28 | 0.28 | 0.29 |
| (7) n1/n1a | 0.97 | 0.97 | 0.96 | 0.97 | 0.97 | 0.95 | 0.97 |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens comprising, in order from an object side thereof:

a first lens block with a positive refractive power, comprising
  a first lens substrate being a parallel flat plate, and
  lens portions 1$a$ and 1$b$ having a positive or negative refractive power, arranged on an object side surface and an image side surface of the first lens substrate, and being different from the first lens substrate in at least one of a refractive index and an Abbe number; and a second lens block with a positive or negative refractive power, comprising
  a second lens substrate being a parallel flat plate, and
  lens portions 2$a$ and 2$b$ having a positive or negative refractive power, arranged on an object side surface and an image side surface of the second lens substrate, and being different from the second lens substrate in at least one of a refractive index and an Abbe number, wherein the lens portion 1$a$ is arranged on the object side surface of the first lens substrate, an object side surface of the lens portion 1$a$ is a convex surface facing the object side, the lens portion 1$b$ is arranged on the image side surface of the first lens substrate, an image side surface of the lens portion 1$b$ is a concave surface facing an image side, the lens portion 2$a$ is arranged on the object side surface of the second lens substrate, an object side surface of the lens portion 2$a$ is a convex surface facing the object side, the lens portion 2$b$ is arranged on the image side surface of the second lens substrate, an image side surface of the lens portion 2$b$ is a concave surface facing the image side, and the image pickup lens satisfies the following expressions:

$$0.4 < f1a/f < 0.9, \text{ and}$$

$$-3.0 < f2b/f < -0.5,$$

where f1$a$ is a focal length of the lens portion 1$a$ in an air, f2$b$ is a focal length of the lens portion 2$b$ in the air, and f is a composite focal length of a total system of the image pickup lens.

2. The image pickup lens of claim 1, wherein the image pickup lens satisfies the following expression:

$$-2.5 < f2b/f < -0.55.$$

3. The image pickup lens of claim 1, wherein the image pickup lens satisfies the following expression:

$$-1.5 < r1b/((1-n1b) \cdot f) < -0.7,$$

where r1$b$ is a curvature radius of the image side surface of the lens portion 1$b$, n1$b$ is a refractive index of the lens portion 1$b$ at d line, and f is the composite focal length of the total system of the image pickup lens.

4. The image pickup lens of claim 1, wherein the object side surface of the lens portion 2$a$ is in an aspheric shape which are formed in a convex surface facing the object side around an optical axis, and are formed in a concave surface facing the object side on a peripheral area crossing to a principal ray at a maximum image height.

5. The image pickup lens of claim 1, wherein the image pickup lens satisfies the following expression:

$$0 < \nu1a - \nu1b < 40,$$

where ν1$a$ is an Abbe number of the lens portion 1$a$, and ν1$b$ is an Abbe number of the lens portion 1$b$.

6. The image pickup lens of claim 1, wherein the image pickup lens satisfies the following expression:

$$0 < f1/|f2| < 0.3,$$

where f1 is a composite focal length of the first lens block and f2 is a composite focal length of the second lens block.

7. The image pickup lens of claim 1, further comprising an aperture stop arranged on the first lens substrate.

8. The image pickup lens of claim 1, wherein each of the first lens substrate and the second lens substrate comprises a glass material.

9. The image pickup lens of claim 1, wherein each of the lens portions 1$a$, 1$b$, 2$a$ and 2$b$ comprises a resin material.

10. The image pickup lens of claim 9, wherein the resin material comprises a curable resin material.

11. The image pickup lens of claim 9, wherein inorganic microparticles of a size of 30 nm or less are dispersed in the resin material.

12. The image pickup lens of claim 1, further comprising a spacer sealing a space between the first lens substrate and the second lens substrate or between the first lens block and the second lens block.

13. An image pickup apparatus comprising an image pickup lens of claim 1.

14. A mobile terminal comprising an image pickup apparatus of claim 13.

* * * * *